United States Patent
Zhou et al.

(10) Patent No.: US 10,574,526 B2
(45) Date of Patent: Feb. 25, 2020

(54) CONTROL METHOD FOR APPLICATION FEATURE RULES AND APPLICATION FEATURE SERVER

(71) Applicant: ZTE CORPORATION, Shenzhen, Guangdong Province (CN)

(72) Inventors: Xiaoyun Zhou, Shenzhen (CN); Hai Jin, Shenzhen (CN); Weibin Wang, Shenzhen (CN); Jiannan Cai, Shenzhen (CN); Jianxun Zuo, Shenzhen (CN); Aihua Li, Shenzhen (CN); Hongbo Cai, Shenzhen (CN)

(73) Assignee: XI'AN ZHONGXING NEW SOFTWARE CO., LTD., Shaanxi (CN)

( * ) Notice: Subject to any disclaimer, the term of this patent is extended or adjusted under 35 U.S.C. 154(b) by 0 days.

(21) Appl. No.: 15/742,864

(22) PCT Filed: Mar. 23, 2016

(86) PCT No.: PCT/CN2016/077145
§ 371 (c)(1),
(2) Date: Jan. 8, 2018

(87) PCT Pub. No.: WO2016/177167
PCT Pub. Date: Nov. 10, 2016

(65) Prior Publication Data
US 2018/0375733 A1     Dec. 27, 2018

(30) Foreign Application Priority Data

Jul. 8, 2015   (CN) .......................... 2015 1 0397645
Jan. 15, 2016   (CN) .......................... 2016 1 0029425

(51) Int. Cl.
*H04L 12/14*    (2006.01)
*H04L 12/24*    (2006.01)
(Continued)

(52) U.S. Cl.
CPC ...... *H04L 41/0893* (2013.01); *H04L 12/1407* (2013.01); *H04L 43/028* (2013.01); *H04L 67/20* (2013.01); *H04L 67/22* (2013.01)

(58) Field of Classification Search
CPC ............. H04L 41/0893; H04L 12/1407; H04L 43/028; G06F 15/16
See application file for complete search history.

(56) References Cited

U.S. PATENT DOCUMENTS

| | | | | |
|---|---|---|---|---|
| 2010/0174770 | A1* | 7/2010 | Pandya | H04L 63/20 709/200 |
| 2011/0244800 | A1* | 10/2011 | Bogestam | G06Q 30/02 455/41.2 |

(Continued)

FOREIGN PATENT DOCUMENTS

| | | |
|---|---|---|
| CN | 103107895 | 5/2013 |
| CN | 103685192 | 3/2014 |

(Continued)

OTHER PUBLICATIONS

International Search Report, International application No. PCT/CN2016/077145, dated Jun. 27, 2016.

(Continued)

*Primary Examiner* — Wei Zhao
(74) *Attorney, Agent, or Firm* — Ferguson Case Orr Paterson LLP

(57) ABSTRACT

A control method for application feature rules is provided. In the method, an application feature server preprocesses one or more application feature fields of a third-party application; and the application feature server provides the one or more preprocessed application feature fields and a corresponding application Identifier (ID) for an Application Detection Control (ADC) as an application feature rule.

15 Claims, 10 Drawing Sheets

(51) Int. Cl.
  *H04L 12/26*  (2006.01)
  *H04L 29/08*  (2006.01)

(56) References Cited

U.S. PATENT DOCUMENTS

| | | |
|---|---|---|
| 2013/0077491 A1 | 3/2013 | Cherian |
| 2013/0316673 A1 | 11/2013 | Goldner |
| 2014/0342690 A1 | 11/2014 | Tanouchev et al. |
| 2017/0257220 A1* | 9/2017 | Guo ..................... H04L 12/14 |
| 2018/0034860 A1* | 2/2018 | Russell ............... H04L 65/1016 |

FOREIGN PATENT DOCUMENTS

| | | |
|---|---|---|
| CN | 103685601 | 3/2014 |
| WO | WO 2009/018759 A1 | 2/2009 |

OTHER PUBLICATIONS

"3rd Generation Partnership Project; Tecknical Specification Group Services and System Aspects; Policy and charging control architecture (Release 13)", 3GPP Draft; 23203-D40 CRS Implemented, 3rd Generation Partnership Protect (3GPP), Mobile Competence Centre ; 650, Route Des Lucioles ; F-06921 Sophia-Antipolis Cedex ; France.

\* cited by examiner

CONTROL METHOD FOR APPLICATION FEATURE RULES AND APPLICATION FEATURE SERVER

TECHNICAL FIELD

The present disclosure relates to, but not limited to, the field of communications, and particularly to a control method for application feature rules, an application feature server, an Application Detection Control (ADC), an application feature rule function and an application feature Rule Database (RDB).

BACKGROUND

FIG. 1 is a schematic diagram of a Policy and Charging Control (PCC) architecture. FIG. 1 shows a PCC architecture defined by the 3rd Generation Partnership Project (3GPP).

A Policy and Charging Rules Function (PCRF) is in charge of specifying Quality of Service (QoS) and charging policy for network resource utilization of a service. The PCRF may need to set a control policy in combination with service information received from an Application Function (AF), subscription information received from a Subscription Profile Repository (SPR), a policy configured by an operating company and the like. The PCRF may transmit control policy setting for the service to a Policy and Charging Enforcement Function (PCEF) or a Bearer Binding and Event Report Function (BBERF). Meanwhile, the PCRF may subscribe to a bearer layer related event from the PCEF and/or the BBERF, so as to timely sense the event occurring in a bearer layer and accordingly change the control policy. In addition, the PCEF may enforce an ADC function according to a PCC rule, and a Traffic Detection Function (TDF) may enforce an ADC function according to ADC rule transmitted by the PCRF. The application detection function of the PCEF and the TDF may enable a bearer network to sense application layer related information, for example, an application type and data stream description information, of data which is being transmitted in the bearer network under the condition that no AF provides service information. The PCRF may set corresponding policies for these applications according to application information and a related network policy, thereby effectively performing differentiated QoS control and guarantee.

At present, the PCEF and the TDF usually adopt a preconfigured algorithm (for example, Deeply Packet Inspection (DPI), a heuristic algorithm), feature base and the like to detect a data packet in the bearer network. However, preconfiguring a feature base on the PCEF and the TDF may have the following problems.

Since service (for example, an Internet service) development of a third-party application is very flexible and high in timeliness, a method of preconfiguring a feature base on a PCEF and a TDF is long in updating period, and may not meet a rapid development requirement of the third-party application.

When the operating company and the third-party application cooperate for service development, hundreds of thousands and even millions of services may be operated on line at the same time. Under such a condition, the operating company may need to correspondingly acquire millions of application feature fields. Storage spaces of the PCEF and the TDF are limited, so that it may be impossible to store a million-level application feature base.

SUMMARY

The below is a summary about a subject matter described in the present disclosure in detail. The summary is not intended to limit the scope of protection of the claims.

Embodiments of the present disclosure provide a policy control method, an application feature server, an ADC, an application feature rule function and an application feature RDB (or may be called RDB for short), which may rapidly deploy millions of third-party applications.

An embodiment of the present disclosure provides a control method for application feature rules, which may include acts as follows.

An application feature server may preprocess one or more application feature fields of a third-party application.

The application feature server may provide the one or more preprocessed application feature fields and a corresponding application Identifier (ID) to an ADC as an application feature rule.

In an exemplary embodiment, the application feature server may adopt a hash algorithm to preprocess the one or more application feature fields of the third-party application.

In an exemplary embodiment, the application feature server may adopt one or more hash algorithms to preprocess the one or more application feature fields of the third-party application, and the application feature server may provide the one or more preprocessed application feature fields and the corresponding application ID to the ADC as the application feature rule.

In an exemplary embodiment, the application feature server may include a PCRF, or may include an Application Access Control (AAC), or may include a Service Capability Exposure Function (SCEF).

In an exemplary embodiment, if the application feature server is a PCRF, the act that the application feature server provides the one or more preprocessed application feature fields and the corresponding application ID to the ADC as the application feature rule may be implemented in the following manner.

The PCRF may judge whether there is attached User Equipment (UE) capable of accessing the third-party application or not. If there is such UE, the PCRF may immediately provide the application feature rule to the ADC. If there is no such UE, the PCRF may provide the application feature rule to the ADC after detecting that UE capable of accessing the third-party application is attached or establishes an Internet Protocol (IP) Connectivity Access Network (IP-CAN) session.

Another embodiment of the present disclosure provides an application feature server, which may include a processing module and a transmission module.

The processing module may be configured to preprocess one or more application feature fields of a third-party application.

The transmission module may be configured to provide the one or more application feature fields preprocessed by the processing module and a corresponding application ID to an ADC as an application feature rule.

In an exemplary embodiment, the processing module may be configured to adopt a hash algorithm to preprocess the one or more application feature fields of the third-party application.

In an exemplary embodiment, the processing module may be configured to adopt one or more hash algorithms to preprocess the one or more application feature fields of the third-party application.

The transmission module may be configured to provide the one or more preprocessed application feature fields and the corresponding application ID to the ADC as the application feature rule.

In an exemplary embodiment, the application feature server may include a PCRF, or may include an AAC, or may include an SCEF.

In an exemplary embodiment, if the application feature server is a PCRF, the transmission module may be configured to judge whether there is attached UE capable of accessing the third-party application or not, if there is such UE, immediately provide the application feature rule to the ADC, and if there is no such UE, provide the application feature rule to the ADC after detecting that UE capable of accessing the third-party application is attached or establishes an IP-CAN session.

Still another embodiment of the present disclosure provides a control method for application feature rules, which may include acts as follows.

An ADC may receive an application feature rule provided by an application feature server or an application feature rule function. The application feature rule may include one or more application feature fields and a corresponding application ID of a third-party application.

The ADC may perform application detection according to the application feature rule.

In an exemplary embodiment, the act that the ADC performs application detection according to the application feature rule may be implemented in the following manner.

The ADC may match a detected application feature field of the third-party application and the one or more application feature fields in the application feature rule, and in case of successful matching, successfully detect the third-party application according to the application feature rule.

In an exemplary embodiment, after the ADC detects the application feature field of the third-party application, the method may further include the following acts.

The ADC may adopt a hash algorithm to process the detected application feature field of the third-party application and may match the processed application feature field and the one or more application feature fields in the application feature rule. Alternatively, the ADC may adopt one or more hash algorithms to process the detected application feature field of the third-party application and may match the processed application feature field and the one or more application feature fields in the application feature rule.

In an exemplary embodiment, before the ADC performs application detection according to the application feature rule, the ADC may receive a policy rule provided by the application feature rule function or a policy rule function. In the exemplary embodiment, the policy rule may contain an application ID.

In an exemplary embodiment, the method may further include the following act. After the ADC receives the policy rule provided by the application feature rule function or the policy rule function, the ADC may request the application feature rule function or an application feature RDB for the application feature rule when judging that there is no application feature rule corresponding to the application ID.

After the ADC detects the third-party application according to the application feature rule, the method may further include the following act.

The ADC may enforce the corresponding policy rule on data of the third-party application.

In an exemplary embodiment, the method may further include the following act.

The ADC may receive the policy rule provided by the application feature rule function or the policy rule function. In the exemplary embodiment, the policy rule may contain an application ID.

In an exemplary embodiment, after the ADC detects the third-party application according to the application feature rule, the method may further include the following act.

The ADC may enforce the corresponding policy rule on the data of the third-party application.

Still another embodiment of the present disclosure provides an ADC, which may include a first receiving module and a detection module.

The first receiving module may be configured to receive an application feature rule provided by an application feature server or an application feature rule function. The application feature rule may include one or more application feature fields and a corresponding application ID of a third-party application.

The detection module may be configured to perform application detection according to the application feature rule.

In an exemplary embodiment, the detection module may be configured to match a detected application feature field of the third-party application and the one or more application feature fields in the application feature rule, and in case of successful matching, successfully detect the third-party application according to the application feature rule.

In an exemplary embodiment, the detection module may further be configured to, after detecting the application feature field of the third-party application, adopt a hash algorithm to process the detected application feature field of the third-party application and match the processed application feature field and the one or more application feature fields in the application feature rule. Alternatively, the detection module may be configured to, after detecting the application feature field of the third-party application, adopt one or more hash algorithms to process the detected application feature field of the third-party application and match the processed application feature field and the one or more application feature fields in the application feature rule.

In an exemplary embodiment, the ADC may further include a second receiving module.

The second receiving module may be configured to receive a policy rule provided by the application feature rule function or a policy rule function. The policy rule may contain an application ID.

In an exemplary embodiment, the ADC may further include a request module.

The request module may be configured to, after the second receiving module receives the policy rule provided by the application feature rule function or the policy rule function, request the application feature rule function or an application feature RDB for the application feature rule when judging that there is no application feature rule corresponding to the application ID.

In an exemplary embodiment, the ADC may further include an enforcement module.

The enforcement module may be configured to, after the detection module successfully detects the third-party application, enforce the corresponding policy rule on data of the third-party application.

In an exemplary embodiment, the ADC may include a PCEF, or may include a TDF.

Still another embodiment of the present disclosure provides a control method for application feature rules, which may include acts as follows.

An application feature rule function may receive one or more application feature fields provided by a third-party application.

The application feature rule function may provide the one or more application feature fields and a corresponding application ID to an ADC and/or an application feature RDB as an application feature rule.

In an exemplary embodiment, after the application feature rule function receives the application feature field provided by the third-party application, the method may further include the following act.

The one or more application feature fields may be preprocessed.

In an exemplary embodiment, the method may further include the following act.

The application feature rule function may provide a policy rule to the ADC, the policy rule including the corresponding application ID.

In an exemplary embodiment, the method may further include the following acts.

The application feature rule function may receive sponsor data connection enabling indication information provided by the third-party application.

The application feature rule function may set a charging key in the corresponding policy rule according to a sponsor ID and/or an Application Service Provider (ASP) ID, or may contain the sponsor ID and/or the ASP ID in the policy rule.

Still another embodiment of the present disclosure provides an application feature rule function, which may include a receiving module and a sending module.

The receiving module may be configured to receive one or more application feature fields provided by a third-party application.

The sending module may be configured to provide the one or more application feature fields and a corresponding application ID to an ADC and/or an application feature RDB as an application feature rule.

In an exemplary embodiment, the application feature rule function may further include a processing module.

The processing module may be configured to preprocess the one or more application feature fields, and after preprocessing is completed, trigger the sending module to provide the one or more application feature fields and the corresponding application ID to the ADC and/or the application feature RDB as the application feature rule.

In an exemplary embodiment, the application feature rule function may further include the sending module.

The sending module may be further configured to provide a policy rule to the ADC, the policy rule including the corresponding application ID.

In an exemplary embodiment, the application feature rule function may further include the processing module.

The receiving module may further be configured to receive sponsor data connection enabling indication information provided by the third-party application.

The processing module may further be configured to set a charging key in the corresponding policy rule according to a sponsor ID and/or an ASP ID, or contain the sponsor ID and/or the ASP ID in the policy rule.

In an exemplary embodiment, the application feature rule function may include: a PCRF, an AAC or an SCEF.

Still another embodiment of the present disclosure provides a control method for application feature rules, which may include acts as follows.

An ADC may report application feature field information of a third-party application to an application feature RDB.

The ADC may enforce a corresponding policy rule on data of the third-party application according to an application ID returned by the application feature RDB after receiving the corresponding application ID returned by the application feature RDB.

In an exemplary embodiment, the application feature field information may include one or more of: an IP address, an IP triple, an IP quintuple and a Universal Resource Locator (URL).

Still another embodiment of the present disclosure provides an ADC, which may include a sending module and a detection module.

The sending module may be configured to report application feature field information of a third-party application to an application feature RDB.

The detection module may be configured to enforce a corresponding policy rule on data of the third-party application according to an application ID returned by the application feature RDB after receiving the corresponding application ID returned by the application feature RDB.

Still another embodiment of the present disclosure provides a control method for application feature rules, which may include acts as follows.

An application feature RDB may receive application feature field information, reported by an ADC, of a third-party application.

The application feature RDB may return a corresponding application ID to the ADC.

In an exemplary embodiment, before the application feature RDB returns the application ID to the ADC, the method may further include the following act.

The application feature RDB may succeed in matching the application feature field information of the third-party application and one or more pre-stored application feature fields corresponding to an application feature rule.

In an exemplary embodiment, the control method may further include the following acts.

The application feature RDB may receive one or more application feature fields and a corresponding application ID provided by an application feature rule function.

The application feature RDB may store the one or more application feature fields and corresponding application ID as an application feature rule.

Still another embodiment of the present disclosure provides an application feature RDB, which may include a receiving module and a sending module.

The receiving module may be configured to receive application feature field information, reported by an ADC, of a third-party application.

The sending module may be configured to return a corresponding application ID to the ADC.

In an exemplary embodiment, the application feature RDB may further include a matching module.

The matching module may be configured to match the application feature field information of the third-party application and one or more pre-stored application feature fields corresponding to an application feature rule, and in case of successful matching, trigger the sending module to return the corresponding application ID to the ADC.

In an exemplary embodiment, the application feature RDB may further include a storage module.

The receiving module may further be configured to receive one or more application feature fields and a corresponding application ID provided by an application feature rule function.

The storage module may be configured to store the one or more application feature fields and corresponding application ID received by the receiving module as an application feature rule.

Still another embodiment of the present disclosure provides a control method for application feature rules, which may include acts as follows.

An application feature rule function may receive one or more application feature fields provided by a third-party application, and provide the one or more application feature fields and a corresponding application ID to an ADC as an application feature rule.

A policy rule function may provide a policy rule to the ADC, the policy rule including the application ID.

In an exemplary embodiment, after the application feature rule function receives the one or more application feature fields provided by the third-party application, the method may further include the following act.

The one or more application feature fields may be preprocessed.

In an exemplary embodiment, the control method may further include the following act.

The policy rule function may receive sponsor data connection enabling indication information provided by the third-party application, set a charging key in the corresponding policy rule according to a sponsor ID and/or an ASP ID, or contain the sponsor ID and/or the ASP ID in the policy rule.

In an exemplary embodiment, the application feature rule function may include: a PCRF, an AAC or an SCEF.

The policy rule function may include: a PCRF.

Still another embodiment of the present disclosure provides a computer-readable storage medium, which may store a computer-executable instruction, the computer-executable instruction being configured to execute the abovementioned control method for application feature rules.

From the above, some embodiments of the present disclosure provide the control method for application feature rules, the application feature server, the ADC, the application feature rule function and the application feature RDB. By virtue of the solution, millions of third-party applications may be rapidly deployed.

After the drawings and detailed descriptions are read and understood, the other aspects may be comprehended.

DETAILED DESCRIPTION OF THE EMBODIMENTS

The embodiments of the present disclosure will be described below in combination with the drawings in detail. It is important to note that the embodiments in the present disclosure and characteristics in the embodiments may be freely combined without conflicts.

Figure 1:
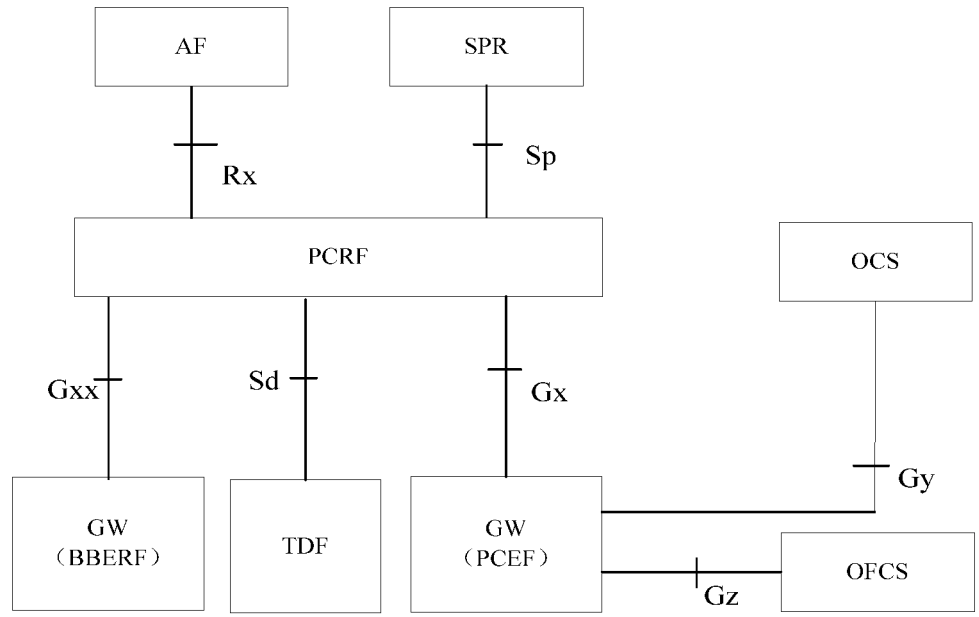
FIG. 1 is a schematic diagram of a PCC architecture.
Figure 2:
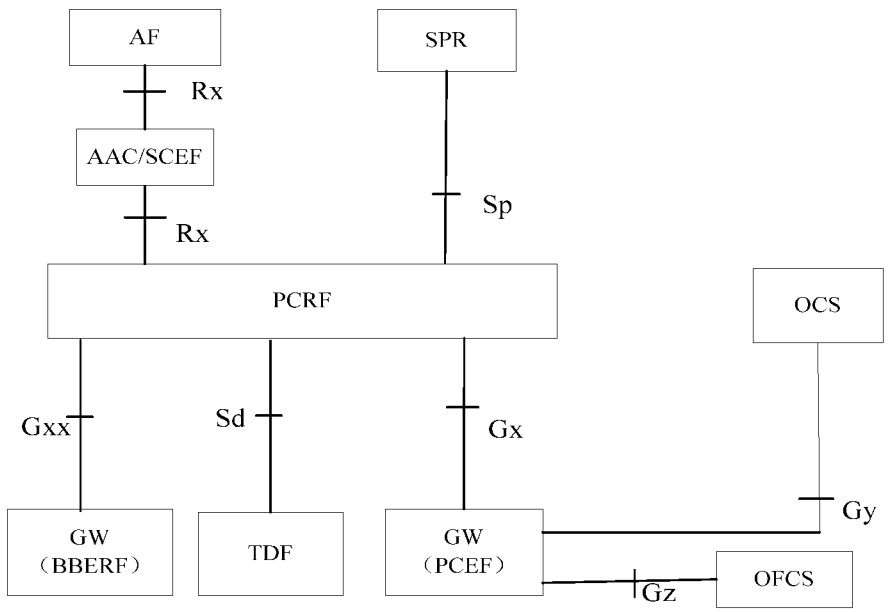
FIG. 2 is a schematic diagram of a PCC architecture of an AAC/SCEF.
Figure 3:
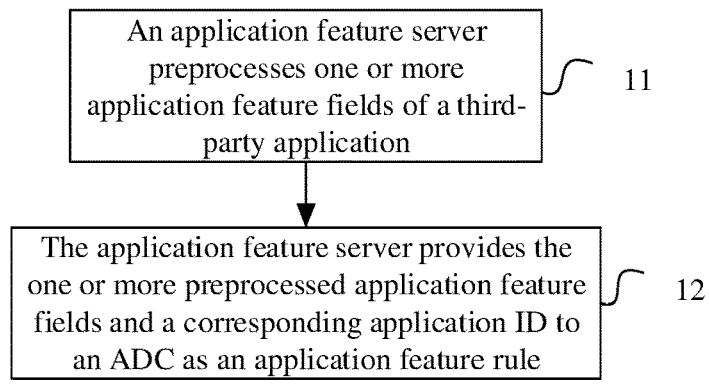
FIG. 3 is a flowchart of a policy control method at an application feature server side according to an embodiment of the present disclosure.

FIG. 3 is a flowchart of a control method for application feature rules at an application feature server side according to an embodiment of the present disclosure. As shown in FIG. 3, the method of the embodiment may include the following acts.

At act 11, an application feature server may preprocess one or more application feature fields of a third-party application.

At act 12, the application feature server may provide the one or more preprocessed application feature fields and a corresponding application ID to an ADC as an application feature rule.

Figure 4:
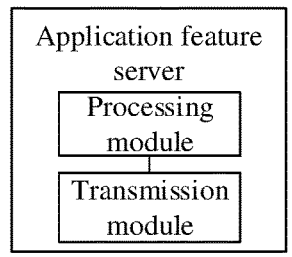
FIG. 4 is a schematic diagram of an application feature server according to an embodiment of the present disclosure.

FIG. 4 is a schematic diagram of an application feature server according to an embodiment of the present disclosure. As shown in FIG. 4, the application feature server of the embodiment may include a processing module and a transmission module.

The processing module may be configured to preprocess one or more application feature fields of a third-party application.

The transmission module may be configured to provide the one or more application feature fields preprocessed by the processing module and a corresponding application ID to an ADC as an application feature rule.

In an exemplary embodiment, the processing module may be configured to adopt a hash algorithm to preprocess the one or more application feature fields of the third-party application.

In an exemplary embodiment, the processing module may be configured to adopt one or more hash algorithms to preprocess the one or more application feature fields of the third-party application.

The transmission module may be configured to provide the one or more preprocessed application feature fields and the corresponding application ID to the ADC as the application feature rule.

In an exemplary embodiment, if the application feature server is a PCRF, the transmission module may be configured to judge whether there is attached UE capable of accessing the third-party application or not, if there is such UE, immediately provide the application feature rule to the ADC, and if there is no such UE, provide the application feature rule to the ADC after detecting that UE capable of accessing the third-party application is attached or establishes an IP-CAN session.

The application feature server may include a PCRF, or include an AAC, or include an SCEF.

Figure 5:
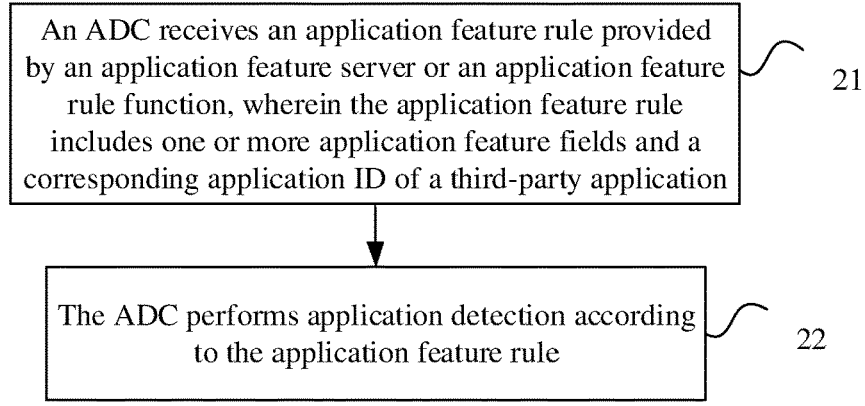
FIG. 5 is a flowchart of a policy control method at an ADC side according to an embodiment of the present disclosure.

FIG. 5 is a flowchart of a control method for application feature rules at an ADC side according to an embodiment of the present disclosure. As shown in FIG. 5, the method of the embodiment may include the following acts.

At act 21, an ADC may receive an application feature rule provided by an application feature server or an application feature rule function, the application feature rule including one or more application feature fields and a corresponding application ID of a third-party application.

At act 22, the ADC may perform application detection according to the application feature rule.

At act 22, the application detection may be performed in the following manner. The ADC may match a detected application feature field of the third-party application and the one or more application feature fields in the application feature rule, and in case of successful matching, successfully detect the third-party application according to the application feature rule.

In an exemplary embodiment, after the ADC detects the application feature field of the third-party application, the method may further include one of the following alternative acts.

The ADC may adopt a hash algorithm to process the detected application feature field of the third-party application and may match the processed application feature field and the one or more application feature fields in the application feature rule.

Alternatively, the ADC may adopt one or more hash algorithms to process the detected application feature field of the third-party application and may match the processed application feature field and the one or more application feature fields in the application feature rule.

Figure 6:
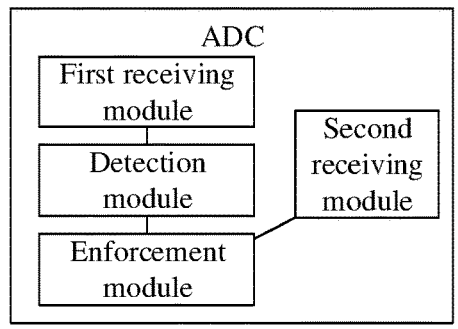
FIG. 6 is a schematic diagram of an ADC according to an embodiment of the present disclosure.

FIG. 6 is a schematic diagram of an ADC according to an embodiment of the present disclosure. As shown in FIG. 6, the ADC of the embodiment may include a first receiving module and a detection module.

The first receiving module may be configured to receive an application feature rule provided by an application feature server or an application feature rule function, the application feature rule including one or more application feature fields and a corresponding application ID of a third-party application.

The detection module may be configured to perform application detection according to the application feature rule.

In an exemplary embodiment, the detection module may be configured to match a detected application feature field of the third-party application and the one or more application feature fields in the application feature rule, and in case of successful matching, successfully detect the third-party application according to the application feature rule.

In an exemplary embodiment, the detection module may be configured to, after detecting the application feature field of the third-party application, further adopt a hash algorithm to process the detected application feature field of the third-party application and match the processed application feature field and the one or more application feature fields in the application feature rule. Alternatively, the detection module may be configured to, after detecting the application feature field of the third-party application, further adopt one or more hash algorithms to process the detected application feature field of the third-party application and match the processed application feature field and the one or more application feature fields in the application feature rule.

In an exemplary embodiment, the ADC may further include a second receiving module.

The second receiving module may be configured to receive a policy rule provided by the application feature rule function or a policy rule function. The policy rule may contain an application ID.

In an exemplary embodiment, the ADC may further include an enforcement module.

The enforcement module may be configured to, after the detection module successfully detects the third-party application, enforce the corresponding policy rule on data of the third-party application.

The ADC may include a PCEF, or may include a TDF.

Figure 7:
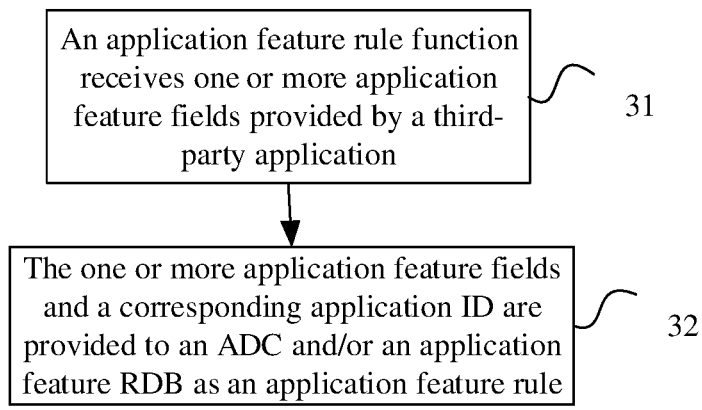
FIG. 7 is a flowchart of a control method for application feature rules at an application feature rule function side according to an embodiment of the present disclosure.

FIG. 7 is a flowchart of a control method for application feature rules at an application feature rule function side according to an embodiment of the present disclosure. As shown in FIG. 7, the method of the embodiment may include the following acts.

At act 31, an application feature rule function may receive one or more application feature fields provided by a third-party application.

At act 32, the application feature rule function may provide the one or more application feature fields and a corresponding application ID to an ADC and/or an application feature RDB as an application feature rule.

In an exemplary embodiment, when the application feature rule function is a PCRF, a policy rule may further be provided to the ADC, the policy rule including the corresponding application ID.

In an exemplary embodiment, when the application feature rule function is a PCRF, sponsor data connection enabling indication information provided by the third-party application may further be received. A charging key may further be set in the corresponding policy rule according to a sponsor ID and/or an ASP ID, or the sponsor ID and/or the ASP ID may be contained in the policy rule.

Figure 8:
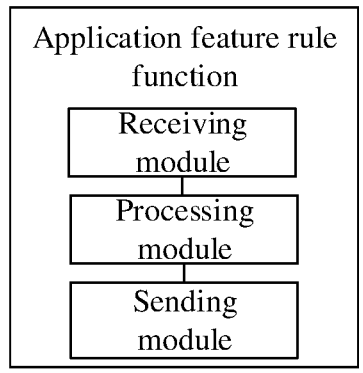
FIG. 8 is a schematic diagram of an application feature rule function according to an embodiment of the present disclosure.

FIG. 8 is a schematic diagram of an application feature rule function according to an embodiment of the present disclosure. As shown in FIG. 8, the application feature rule function of the embodiment may include a receiving module and a sending module.

The receiving module may be configured to receive one or more application feature fields provided by a third-party application.

The sending module may be configured to provide the one or more application feature fields and a corresponding application ID to an ADC and/or an application feature RDB as an application feature rule.

In an exemplary embodiment, the application feature rule function may further include a processing module.

The processing module may be configured to preprocess the one or more application feature fields, and after preprocessing is completed, trigger the sending module to provide the one or more application feature fields and the corresponding application ID to the ADC and/or the application feature RDB as the application feature rule.

In an exemplary embodiment, when the application feature rule function is a PCRF, the sending module may further be configured to provide a policy rule to the ADC, the policy rule including the corresponding application ID.

In an exemplary embodiment, when the application feature rule function is a PCRF, the receiving module may further be configured to receive sponsor data connection enabling indication information provided by the third-party application; and the processing module may further be configured to set a charging key in the corresponding policy rule according to a sponsor ID and/or an ASP ID, or contain the sponsor ID and/or the ASP ID in the policy rule.

The application feature rule function may include: a PCRF, an AAC or an SCEF.

Figure 9:
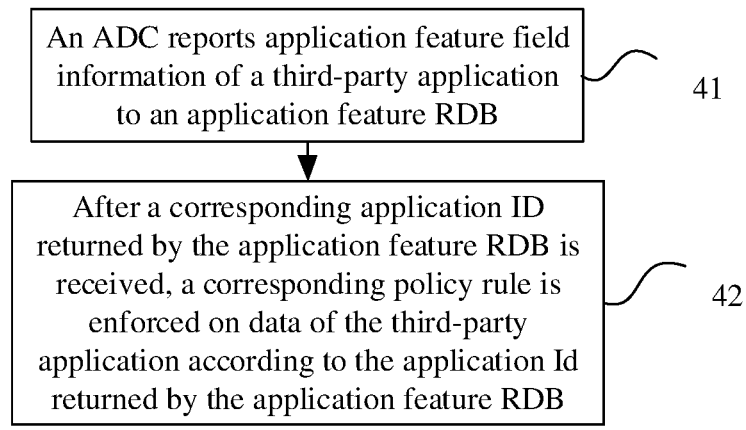
FIG. 9 is a flowchart of a control method for application feature rules at an ADC side according to another embodiment of the present disclosure.

FIG. 9 is a flowchart of a control method for application feature rules at an ADC side according to another embodiment of the present disclosure. As shown in FIG. 9, the method of the embodiment may include the following acts.

At act 41, an ADC may report application feature field information of a third-party application to an application feature RDB.

At act 42, the ADC may enforce a corresponding policy rule on data of the third-party application according to an application ID returned by the application feature RDB after receiving the corresponding application ID returned by the application feature RDB.

The application feature field information may include one or more of: an IP address, an IP triple, an IP quintuple and a URL.

Figure 10:
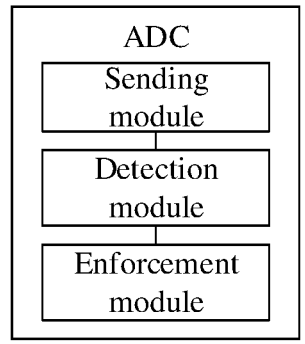
FIG. 10 is a schematic diagram of an ADC according to another embodiment of the present disclosure.

FIG. 10 is a schematic diagram of an ADC according to another embodiment of the present disclosure. As shown in FIG. 10, the ADC of the embodiment may include a sending module and a detection module.

The sending module may be configured to report application feature field information of a third-party application to an application feature RDB.

The detection module may be configured to enforce a corresponding policy rule on data of the third-party application according to an application ID returned by the application feature RDB after receiving the corresponding application ID returned by the application feature RDB.

Figure 11:
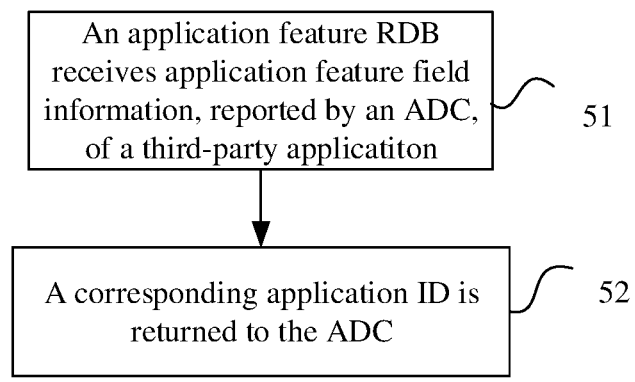
FIG. 11 is a flowchart of a control method for application feature rules according to an embodiment of the present disclosure.

FIG. 11 is a flowchart of a control method for application feature rules for an application feature RDB side according to an embodiment of the present disclosure. As shown in FIG. 11, the method of the embodiment may include the following acts.

At act 51, an application feature RDB may receive application feature field information, reported by an ADC, of a third-party application.

At act 52, the application feature RDB may return a corresponding application ID to the ADC.

In an exemplary embodiment, before the application feature RDB returns the application ID to the ADC, the method may further include the following act.

The application feature RDB may succeed in matching the application feature field information of the third-party application and one or more pre-stored application feature fields corresponding to an application feature rule.

In an exemplary embodiment, the application feature RDB may further receive one or more application feature fields and a corresponding application ID provided by an application feature rule function, and store the one or more application feature fields and corresponding application ID as an application feature rule.

Figure 12:
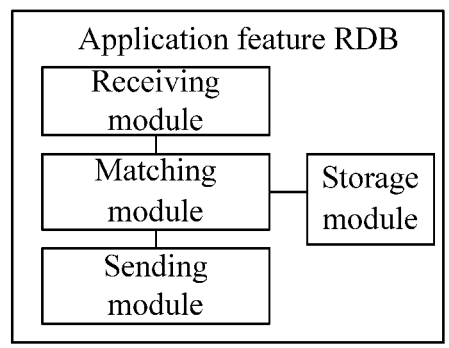
FIG. 12 is a schematic diagram of an application feature RDB according to an embodiment of the present disclosure.

FIG. 12 is a schematic diagram of an application feature RDB according to an embodiment of the present disclosure. As shown in FIG. 12, the application feature RDB of the embodiment may include a receiving module and a sending module.

The receiving module may be configured to receive application feature field information, reported by an ADC, of a third-party application.

The sending module may be configured to return a corresponding application ID to the ADC.

In an exemplary embodiment, the application feature RDB may further include a matching module.

The matching module may be configured to match the application feature field information of the third-party application and one or more pre-stored application feature fields corresponding to an application feature rule, and in case of successful matching, trigger the sending module to return the corresponding application ID to the ADC.

In an exemplary embodiment, the application feature RDB may further include: a storage module.

The receiving module may be further configured to receive one or more application feature fields and a corresponding application ID provided by an application feature rule function.

The storage module may be configured to store the one or more application feature fields and corresponding application ID received by the receiving module as an application feature rule.

An embodiment of the present disclosure provides a control method for application feature rules, which may include the following acts.

An application feature rule function may receive one or more application feature fields provided by a third-party application, and provide the one or more application feature fields and a corresponding application ID to an ADC as an application feature rule.

A policy rule function may provide a policy rule to the ADC, the policy rule including the application ID.

In an exemplary embodiment, after the application feature rule function receives the one or more application feature fields provided by the third-party application, the method may further include the following act.

The one or more application feature fields may be preprocessed.

In an exemplary embodiment, the policy rule function may receive sponsor data connection enabling indication information provided by the third-party application, set a charging key in the corresponding policy rule according to a sponsor ID and/or an ASP ID, or contain the sponsor ID and/or the ASP ID in the policy rule.

The application feature rule function may include: a PCRF, an AAC or an SCEF.

The policy rule function may include: a PCRF.

By the methods of some embodiments of the present disclosure, the problem of incapability in rapidly deploying millions of third-party applications may be solved.

First Embodiment

Figure 13:
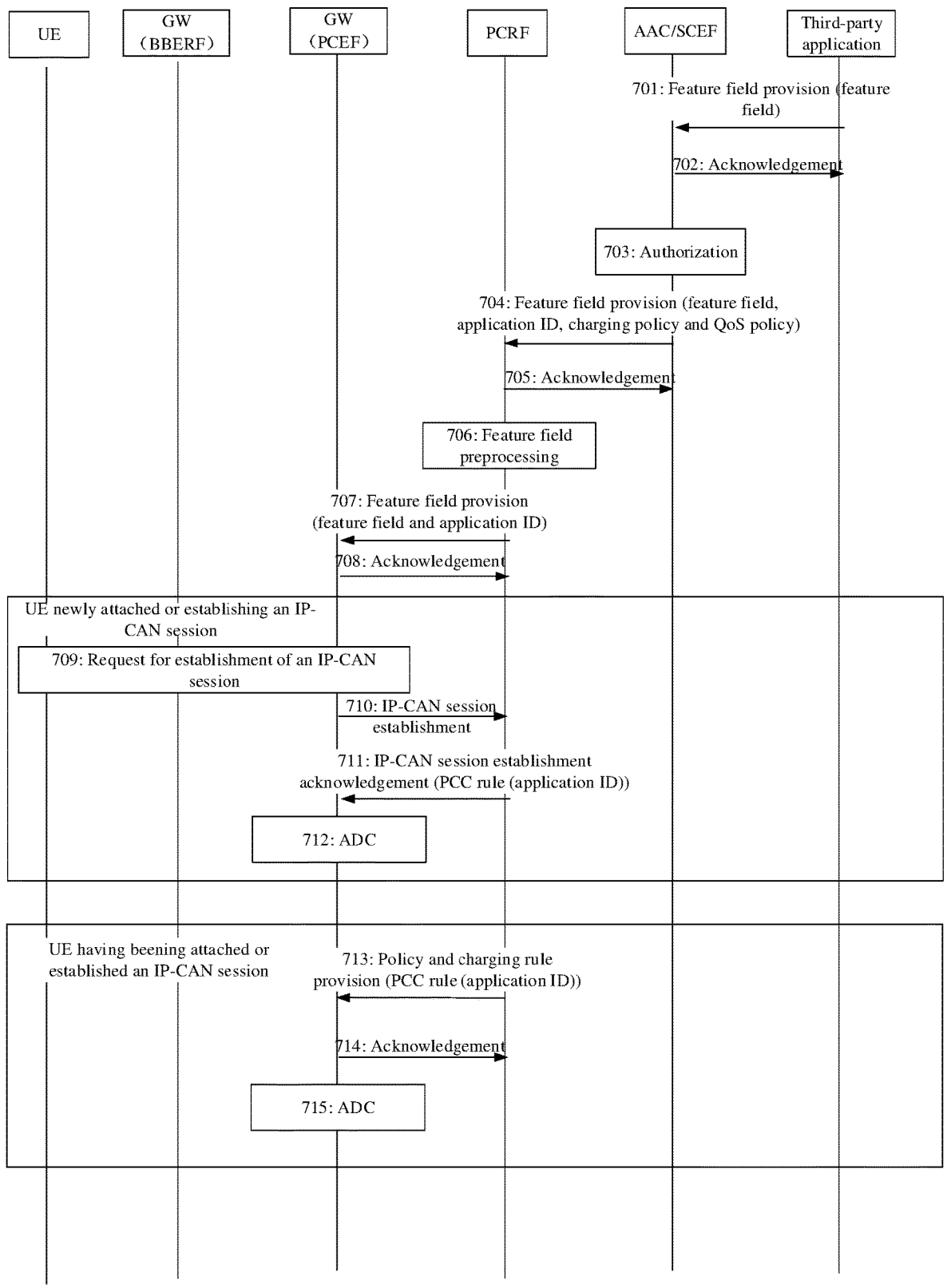
FIG. 13 is a flowchart of a control method for application feature rules according to the first embodiment of the present disclosure.

In the exemplary embodiment, a PCRF may provide an application feature rule to a PCEF, including acts shown in FIG. 13.

At act 701, a third-party application may decide to deploy a new type of application, and the third-party application may provide an application feature field (also called as packet stream description information) of this type of application for a network to identify the new application for an AAC/SCEF. The application feature field may be an IP quintuple, IP triple and URL of the application, an IP address and/or IP address field of a server. The third-party application may further provide service related description information for the AAC/SCEF. The service related description information may be a service type, QoS required by a service, a charging type of the service and the like. The third-party application may further provide a sponsor ID, an ASP ID and indication information about whether to enable a sponsor data connection or not for the AAC/SCEF.

At act 702, the AAC/SCEF may return an acknowledgement message.

At act 703, an operating company (AAC/SCEF) may authorize a request of the third-party application, and determine an application ID (represented as application ID 1 here), a charging policy and a QoS policy of the application. The charging policy may include a charging key required to be set for the application, and the QoS policy may include a QoS Class Identifier (QCI), Allocation and Retention Priority (ARP) and the like required to be set for the application. The application ID may be negotiated by the operating company and the third-party application in advance or dynamically allocated by the SCEF. The AAC/SCEF may determine the application ID according to the sponsor ID and/or the ASP ID.

In an exemplary embodiment, the act 702 may be executed after the AAC/SCEF determines the application ID of the application, and then, the AAC/SCEF may provide the determined application ID for the third-party application.

The AAC/SCEF may usually be deployed by the operating company or deployed by a trusted third party.

At act 704, the AAC/SCEF may provide application feature field to the PCRF. The provided information may include the application feature field, the application ID 1, the charging policy, the QoS policy, the sponsor ID, the ASP ID, the indication information about whether to enable the sponsor data connection or not and the like.

At act 705, the PCRF may return an acknowledgement message.

At act 706, optionally, the PCRF may preprocess the received application feature field. A preprocessing operation is as follows.

For the condition that the application feature field is the URL, the IP quintuple, the IP triple, the IP address and/or the IP address field, the PCRF may adopt a hash algorithm to process the application feature field.

For a URL with any length, a hash value with a fixed length may be obtained.

In order to reduce a probability of conflict, the PCRF may adopt 2 or 3 hash functions to perform calculation on the same URL, IP quintuple, IP address or IP address field to obtain 2 or 3 hash values. In order to ensure no conflict, the PCRF may calculate all effective URLs, and if it is found that any two different URLs, IP quintuples, IP triples, IP addresses or IP address fields have the same hash value, the PCRF may need to add another hash function to ensure that different URLs, IP quintuples, IP triples, IP addresses or IP address fields have different hash values (or hash groups). That is, a hash value (or hash group) is able to uniquely distinguish a URL, an IP quintuple, an IP triple, an IP address or an IP address field.

At act 707, the PCRF may provide the application feature field and the corresponding application ID (i.e. the application ID 1) to the PCEF as an application feature rule (represented as an application feature rule 1 here). If the PCRF executes the preprocessing operation, the PCRF may provide the preprocessed application feature field and the corresponding application ID (i.e. the application ID 1) to the PCEF as the application feature rule (represented as the application feature rule 1 here). That is, a corresponding relationship between a hash value (or hash group) and an application ID may be sent to the PCEF as the application feature rule. The PCEF may update the application feature rule 1 into a locally stored application feature base. Thereafter, the PCEF may detect the application according to the newly updated application feature rule 1. The application feature rule may be seen as the corresponding relationship between the application ID and the application feature field.

At act 708, the PCEF may return an acknowledgment message to the PCRF.

Meanwhile, a Business and Operation Support System (BOSS) of the operating company may update a subscription and perform policy configuration on the PCRF. For example, the subscription may be updated to add a subscription about whether a subscriber may access the application or not and the like, and a configuration policy of the PCRF may be updated to enable the PCRF to set a corresponding PCC rule configured to detect and control the application.

Acts 709-712 form a flow that the PCEF performs ADC on a user newly attached or newly establishing an IP-CAN section after receiving the application feature rule 1.

At act 709, UE is attached to the network, and requests to establish the IP-CAN session.

At act 710, the PCEF may send an IP-CAN session establishment request message to the PCRF, the message containing information such as a user ID.

At act 711, the PCRF may determine that the user is allowed to access the application provided by the third-party application at act 701 according to subscription information of the user, and thus may contain one or a group of PCC rules in the PCC rule transmitted by the PCRF, the PCC rule containing the application ID 1, the charging policy and the QoS policy. If the SCEF indicates the sponsor data connection to be enabled, the PCRF may set a special charging key in the charging policy according to the sponsor ID and the ASP ID, or may further contain the sponsor ID and the ASP ID in the PCC rule. The PCEF may install the transmitted PCC rule. The PCRF may need to interact with an SPR to acquire the subscription of the user.

At act 712, thereafter, when the UE accesses the application, the PCEF may perform matching according to the application feature base after detecting the IP address, IP quintuple, IP triple and/or URL of the application accessed by the user. For the UE, the PCEF may only match application feature rules (including the application feature rule 1) with an application ID the same as that of the PCC rule transmitted by the PCRF. If the PCRF transmits the preprocessed feature rule and the application ID 1, the PCEF may adopt the same one or more hash functions configured by the PCRF to perform hashing on the IP address, the IP quintuple, the IP triple or the URL, and match the hashing result with the hash values (or hash groups) provided by the PCRF. In case of successful matching with the hash value (or hash group) in the application feature rule 1, the PCEF may judge that the application corresponding to the application feature rule 1 is detected. After the PCEF detects the application, the PCEF may enforce the PCC rule of the application, namely enforcing the corresponding charging policy, QoS policy and the like.

Acts 713-715 form a flow for a user having been attached or established an IP-CAN session when the PCEF receives the application feature rule 1.

At act 713, the PCRF may determine that the user is allowed to access the application provided by the third-party application at act 701 according to subscription information of the user, and thus the PCRF may update the PCC rule to the PCEF. One PCC rule may be contained, and the PCC rule may contain the application ID 1, the charging policy and the QoS policy. If the SCEF indicates the sponsor data connection to be enabled, the PCRF may set the special charging key in the charging policy according to the sponsor ID and the ASP ID, or may further contain the sponsor ID and the ASP ID in the PCC rule. The PCRF may need to interact with the SPR to acquire the subscription of the user.

At act 714, the PCEF may return an acknowledgement message.

At act 715, thereafter, when the UE accesses the application, the PCEF may perform matching with the application feature base after detecting the IP address, IP triple, IP quintuple and/or URL of the application accessed by the user. For the UE, the PCEF may only match the application feature rules (including the application feature rule 1) with an application ID the same as that of the PCC rule transmitted by the PCRF. If the PCRF transmits the preprocessed feature rule and the application ID 1, the PCEF may adopt the same one or more hash functions configured by the PCRF to perform hashing on the IP address, the IP triple, the IP quintuple or the URL, and match the hashing result with the hash values (or hash groups) provided by the PCRF. In case of successful matching with the hash value (or hash group) in the application feature rule 1, the PCEF may judge that the application corresponding to the application feature rule 1 is detected. After the PCEF detects the application, the PCEF may enforce the PCC rule of the application, namely enforcing the corresponding charging policy, QoS policy and the like.

In the embodiment, after receiving the application feature field provided by the AAC/SCEF and generating the application feature rule, the PCRF may immediately provide the application feature field to the PCEF. In another embodiment, the PCRF may judge whether there is attached UE capable of accessing the application or not, and if there is such UE, the PCRF may immediately provide the generated application feature rule to the PCEF. If there is no such UE, after the PCRF detects UE capable of accessing the application is attached or establishes an IP-CAN session, the PCRF may provide the application feature rule to the PCEF.

In the embodiment, the charging policy and the QoS policy are provided to the PCRF by the AAC/SCEF, while in an alternative embodiment, the charging policy and the QoS policy may also be directly configured on the PCRF by the BOSS.

In the embodiment, the application ID corresponding to the application feature field is determined by the AAC/SCEF, while in an alternative embodiment, the AAC/SCEF may provide information to the PCRF after authorizing the third-party application, and the PCRF may finally determine the application ID corresponding to the third-party application feature field.

In the embodiment, the PCRF actively provides the corresponding relationship between the application ID and the application feature field (and the feature rule) to the PCEF. In another embodiment, the PCEF may also request to acquire the corresponding relationship from the PCRF. That is, act 707 and act 708 may not be executed at first. When the PCEF receives the PCC rule provided by the PCRF at act 711 or act 713, the PCEF may judge that there is yet no application feature field corresponding to the application ID 1, the PCEF may send a request message for the application feature field to the PCRF, the message may contain the application ID 1. The PCRF may return the application feature field corresponding to the application ID 1 in the acknowledgement message. Thereafter, the PCEF may continue executing ADC of act 712 or act 715. Here, a process that the PCEF requests to acquire the application feature field may need to be executed only once for an application ID.

In addition, after the embodiment is executed, the third-party application may further update the feature rule (and the corresponding relationship between the application ID and the application feature field). The third-party application may provide a corresponding relationship between the application ID 1 and a new application feature field for the AAC/SCEF. The AAC/SCEF may further provide the corresponding relationship between the application ID 1 and the new application feature field to the PCRF. The PCRF may provide the corresponding relationship between the application ID 1 and the new application feature field to the PCEF. The PCEF may locally update the application feature RDB.

It may be appreciated that the third-party application may also delete the feature rule, the third-party application may provide the application ID 1 and a deletion indication for the AAC/SCEF. The AAC/SCEF may further provide the application ID 1 and the deletion indication to the PCRF. The PCRF may indicate the PCEF to delete the feature rule corresponding to the application ID 1. The PCEF may delete the feature rule corresponding to the application ID 1, and may simultaneously delete all PCC rules including the application ID 1.

In the embodiment, the PCRF dynamically provides the PCC rule to the PCEF, that is, the application ID 1, the charging policy and the QoS policy are contained in the PCC rule. In another embodiment, the application ID 1, the charging policy and the QoS policy may alternatively be preconfigured on the PCEF as a predefined PCC rule. When the PCRF decides to activate the PCC rule, the PCRF may only need to provide a rule name of the PCC rule to the PCEF.

Second Embodiment

Figure 14:
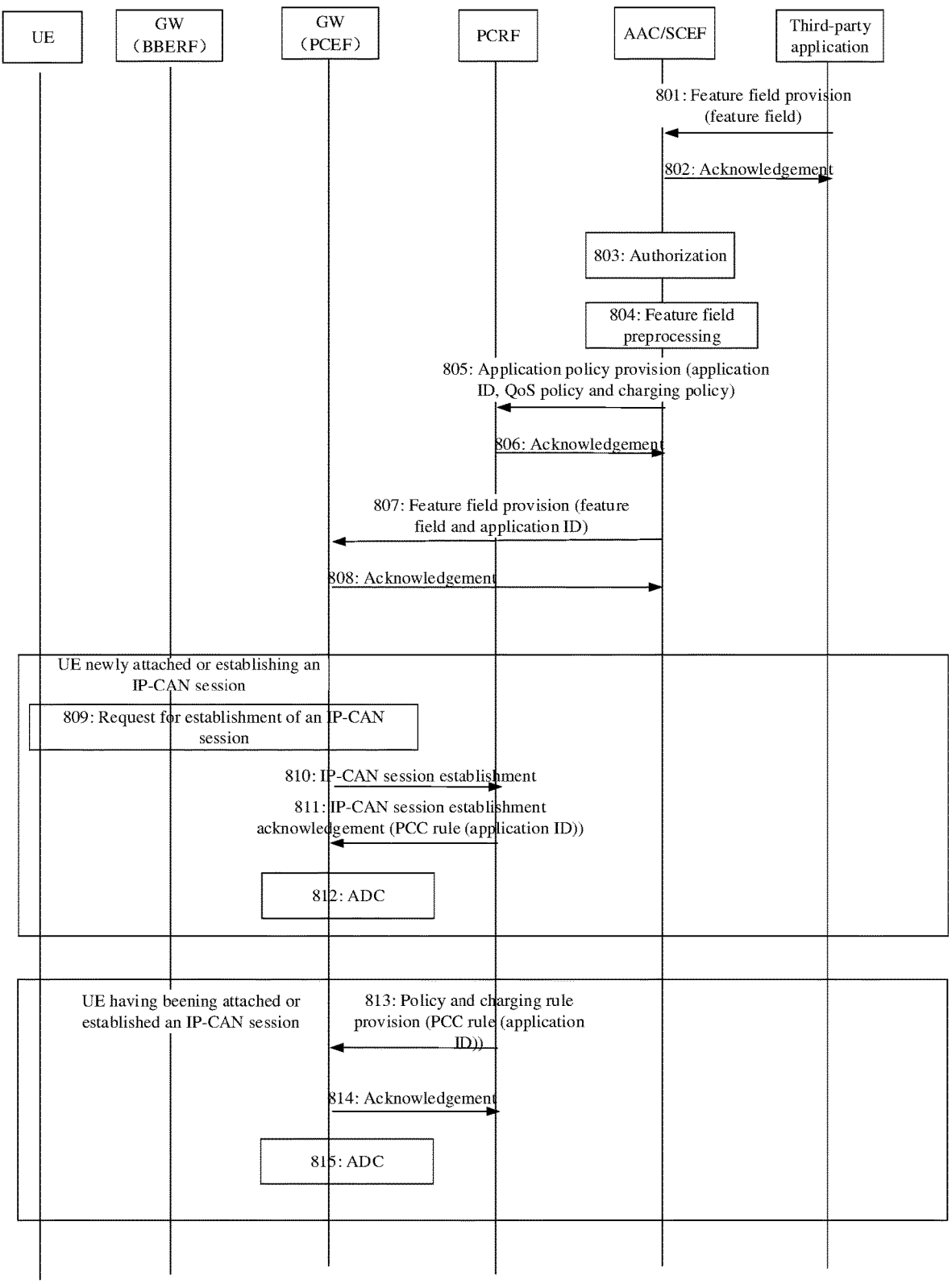
FIG. 14 is a flowchart of a control method for application feature rules according to the second embodiment of the present disclosure.

In the exemplary embodiment, an AAC or an SCEF may provide an application feature rule to a PCEF, including acts shown in FIG. 14.

At act 801, a third-party application may decide to deploy a new type of application, and the third-party application may provide an application feature field (also called as packet stream description information) of this type of application for a network to identify the new application for the AAC/SCEF. The application feature field may be an IP quintuple, an IP triple, a URL, an IP address and/or IP address field of a server. The third-party application may further provide service related description information for the AAC/SCEF. The service related description information may be a service type, QoS required by a service, a charging type of the service and the like. The third-party application may further provide a sponsor ID, an ASP ID and indication information about whether to enable a sponsor data connection or not for the AAC/SCEF.

At act 802, the AAC/SCEF may return an acknowledgement message.

At act 803, an operating company (AAC/SCEF) may authorize a request of the third-party application, and determine an application ID (represented as application ID 1 here), a charging policy and a QoS policy of the application. The charging policy may include a charging key required to be set for the application, and the QoS policy may include a QCI, ARP and the like required to be set for the application. The application ID may be negotiated by the operating company and the third-party application in advance or dynamically allocated by the SCEF. The AAC/SCEF may determine the application ID according to the sponsor ID and/or the ASP ID.

In an exemplary embodiment, the act 802 may be executed after the AAC/SCEF determines the application ID of the application, and then, the AAC/SCEF may provide the determined application ID for the third-party application.

At act 804, optionally, the AAC/SCEF may preprocess the received application feature field. A preprocessing operation is as follows.

For the condition that the application feature field is the URL, the IP quintuple, the IP triple, the IP address and/or the IP address field, the AAC/SCEF may adopt one or more hash algorithms to process the application feature field.

For a URL with any length, a hash value with a fixed length may be obtained.

In order to reduce a probability of conflict, the AAC/SCEF may adopt 2 or 3 hash functions to perform calculation on the same URL, IP quintuple, IP triple, IP address or IP address field to obtain 2 or 3 hash values. In order to ensure no conflict, a PCRF may calculate all effective URLs, and if it is found that any two different URLs, IP quintuples, IP triples, IP addresses or IP address fields have the same hash value, the AAC/SCEF may need to add another hash function to ensure that different URLs, IP quintuples, IP triples, IP addresses or IP address fields have different hash values (or hash groups). That is, a hash value (or hash group) is able to uniquely distinguish a URL, an IP quintuple, an IP triple, an IP address or an IP address field.

At act 805, the AAC/SCEF may provide an application policy to the PCRF, including the application ID (i.e. the application ID 1), the charging key, the QoS policy, the sponsor ID, the ASP ID, the indication information about whether to enable the sponsor data connection or not and the like.

At act 806, the PCRF may return an acknowledgement message to the AAC/SCEF.

At act 807, the AAC/SCEF may provide the application feature field and the corresponding application ID (i.e. the application ID 1) to the PCEF as an application feature rule (represented as an application feature rule 1 here). If the AAC/SCEF executes the preprocessing operation, the AAC/SCEF may provide the preprocessed application feature field and the corresponding application ID (i.e. the application ID 1) to the PCEF as the application feature rule (represented as the application feature rule 1 here). That is, a corresponding relationship between a hash value (or hash group) and an application ID may be sent to the PCEF as the application feature rule. The PCEF may update the application feature rule 1 into a locally stored application feature base. Thereafter, the PCEF may detect the application according to the newly updated application feature rule 1. The application feature rule may be seen as the corresponding relationship between the application ID and the application feature field.

At act 808, the PCEF may return an acknowledgment message to the AAC/SCEF.

Meanwhile, a BOSS of the operating company may update a subscription and perform policy configuration on the PCRF. For example, the subscription may be updated to add subscription information about whether a subscriber may access the application or not and the like, and a configuration policy of the PCRF may be updated to enable the PCRF to set a corresponding PCC rule configured to detect and control the application.

Acts 809-812 form a flow that the PCEF performs ADC on a user newly attached or newly establishing an IP-CAN section after receiving the application feature rule 1.

At act 809, UE is attached to the network, and requests to establish the IP-CAN session.

At act 810, the PCEF may send an IP-CAN session establishment request message to the PCRF, the message containing information such as a user ID.

At act 811, the PCRF may determine that the user is allowed to access the application provided by the third-party application at act 801 according to subscription information of the user, and thus may contain a PCC rule in the PCC rule transmitted by the PCRF, the PCC rule containing the application ID 1, the charging policy and the QoS policy. The PCEF may install the transmitted PCC rule. If the SCEF indicates the sponsor data connection to be enabled, the PCRF may set a special charging key in the charging policy according to the sponsor ID and the ASP ID, or may further contain the sponsor ID and the ASP ID in the PCC rule. The PCRF may need to interact with an SPR to acquire the subscription of the user.

At act 812, thereafter, when the UE accesses the application, the PCEF may perform matching with the application feature base after detecting the IP address, IP triple, IP quintuple and/or URL of the application accessed by the user. For the UE, the PCEF may only match application feature rules (including the application feature rule 1) with an application ID the same as that of the PCC rule transmitted by the PCRF. If the PCRF transmits the preprocessed feature rule and the application ID 1, the PCEF may adopt the same one or more hash functions configured by the PCRF to perform hashing on the IP address, the IP quintuple, the IP triple or the URL, and match the hashing result with the hash values (or hash groups) provided by the PCRF. In case of successful matching with the hash value (or hash group) in the application feature rule 1, the PCEF may judge that the application corresponding to the application feature rule 1 is detected. After the PCEF detects the application, the PCEF may enforce the PCC rule of the application, namely enforcing the corresponding charging policy, QoS policy and the like.

Acts 813-815 form a flow for a user having been attached or established an IP-CAN session when the PCEF receives the application feature rule 1.

At act 813, the PCRF may determine that the user is allowed to access the application provided by the third-party application at act 701 according to subscription information of the user, and thus the PCRF may update the PCC rule to the PCEF. One PCC rule may be contained, and the PCC rule may contain the application ID 1, the charging policy and the QoS policy. If the SCEF indicates the sponsor data connection to be enabled, the PCRF may set a special transaction key (charging key) in the charging policy according to the sponsor ID and the ASP ID, or may further contain the sponsor ID and the ASP ID in the PCC rule. The PCRF may need to interact with the SPR to acquire the subscription of the user.

At act 814, the PCEF may return an acknowledgement message.

At act 815, thereafter, when the UE accesses the application, the PCEF may perform matching with the application feature base after detecting the IP address, IP triple, IP quintuple and/or URL of the application accessed by the user. For the UE, the PCEF may only match the application feature rules (including the application feature rule 1) with an application ID the same as that of the PCC rule transmitted by the PCRF. If the PCRF transmits the preprocessed feature rule and the application ID 1, the PCEF may adopt the same one or more hash functions configured by the PCRF to perform hashing on the IP address, the IP triple, the IP quintuple or the URL, and match the hashing result with the hash values (or hash groups) provided by the PCRF. In case of successful matching with the hash value (or hash group) in the application feature rule 1, the PCEF may judge that the application corresponding to the application feature rule 1 is detected. After the PCEF detects the application, the PCEF may enforce the PCC rule of the application, namely enforcing the corresponding charging policy, QoS policy and the like.

In the embodiment, the charging policy and the QoS policy are provided to the PCRF by the AAC/SCEF, while in an alternative embodiment, the charging policy and the QoS policy may also be directly configured on the PCRF by the BOSS.

In the embodiment, the AAC/SCEF actively provides the corresponding relationship between the application ID and the application feature field (and the feature rule) to the PCEF. In another embodiment, the PCEF may also request the AAC/SCEF to acquire the corresponding relationship. That is, act 807 and act 808 may not be executed at first. When the PCEF receives the PCC rule provided by the PCRF at act 811 or act 813, the PCEF may judge that there is yet no application feature field corresponding to the application ID 1 (that is, there is no corresponding application feature rule), and therefore the PCEF may send a request message for the application feature field to the AAC/SCEF, the message may contain the application ID 1. The AAC/SCEF may return the application feature field corresponding to the application ID 1 in the acknowledgement message. Thereafter, the PCEF may continue executing ADC of act 812 or act 815. Here, a process that the PCEF requests to acquire the application feature field may need to be executed only once for an application ID.

In addition, after the embodiment is executed, the third-party application may further update the feature rule (and the corresponding relationship between the application ID and the application feature field). The third-party application may provide a corresponding relationship between the application ID 1 and a new application feature field for the AAC/SCEF. The AAC/SCEF may provide the corresponding relationship between the application ID 1 and the new application feature field to the PCEF. The PCEF may locally update the application feature RDB.

It may be appreciated that the third-party application may also delete the feature rule, the third-party application may provide the application ID 1 and a deletion indication for the AAC/SCEF. The AAC/SCEF may indicate the PCEF to delete the feature rule corresponding to the application ID 1. The PCEF may delete the feature rule corresponding to the application ID 1, and may simultaneously delete all PCC rules including the application ID 1.

In the embodiment, the PCRF dynamically provides the PCC rule to the PCEF, that is, the application ID 1, the charging policy and the QoS policy are contained in the PCC rule. In another embodiment, the application ID 1, the charging policy and the QoS policy may alternatively be preconfigured on the PCEF as a predefined PCC rule. When the PCRF decides to activate the PCC rule, the PCRF may only need to provide a rule name of the PCC rule to the PCEF.

Third Embodiment

Figure 15:
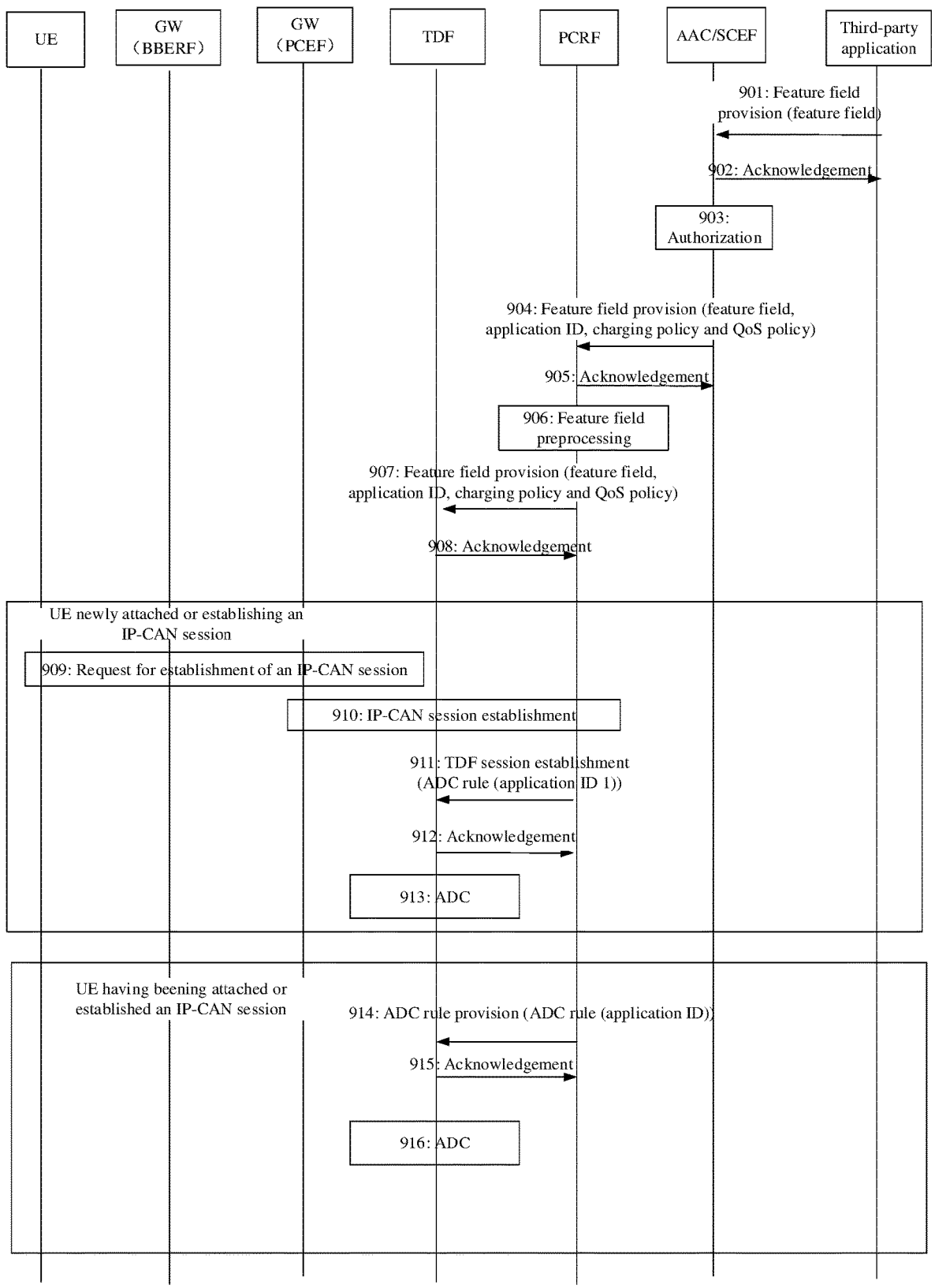
FIG. 15 is a flowchart of a control method for application feature rules according to the third embodiment of the present disclosure.

In the exemplary embodiment, a PCRF may provide an application feature rule for a TDF, including acts shown in FIG. 15.

At act 901, a third-party application may decide to deploy a new type of application, and the third-party application may provide an application feature field (also called as packet stream description information) of this type of application for a network to identify the new application for an AAC/SCEF. The application feature field may be an IP quintuple, an IP triple, a URL, an IP address and/or IP address field of a server. The third-party application may further provide service related description information for the AAC/SCEF. The service related description information may be a service type, QoS required by a service, a charging type of the service and the like. The third-party application may further provide a sponsor ID, an ASP ID and indication information about whether to enable a sponsor data connection or not for the AAC/SCEF.

At act 902, the AAC/SCEF may return an acknowledgement message.

At act 903, an operating company (AAC/SCEF) may authorize a request of the third-party application, and determine an application ID (represented as application ID 1 here), a charging policy and a QoS policy of the application. The charging policy may include a charging key required to be set for the application, and the QoS policy may include a QCI, ARP and the like required to be set for the application. The application ID may be negotiated by the operating company and the third-party application in advance or dynamically allocated by the SCEF. The AAC/SCEF may determine the application ID according to the sponsor ID and/or the ASP ID.

In an exemplary embodiment, act 903 may be executed after the AAC/SCEF determines the application ID of the application, and then, the AAC/SCEF may provide the determined application ID for the third-party application.

At act 904, the AAC/SCEF may provide application feature field to the PCRF. The provided information may include the application feature field, the application ID, the charging policy, the QoS policy, the sponsor ID, the ASP ID, the indication information about whether to enable the sponsor data connection or not and the like.

At act 905, the PCRF may return an acknowledgement message.

At act 906, optionally, the PCRF may preprocess the received application feature field. A preprocessing operation is as follows.

For the condition that the application feature field is the URL, the IP quintuple, the IP triple, the IP address or the IP address field, the PCRF may adopt one or more hash algorithms to process the application feature field.

For a URL with any length, a hash value with a fixed length may be obtained.

In order to reduce a probability of conflict, the PCRF may adopt 2 or 3 hash functions to perform calculation on the same URL, IP quintuple, IP triple, IP address or IP address field to obtain 2 or 3 hash values. In order to ensure no conflict, the PCRF may calculate all effective URLs, and if it is found that any two different URLs, IP quintuples, IP triples, IP addresses or IP address fields have the same hash value, the PCRF may need to add another hash function to ensure that different URLs, IP quintuples, IP triples, IP addresses or IP address fields have different hash values (or hash groups). That is, a hash value (or hash group) is able to uniquely distinguish a URL, an IP quintuple, an IP triple, an IP address or an IP address field.

At act 907, the PCRF may provide the application feature field and the corresponding application ID (i.e. the application ID 1) for the TDF as an application feature rule (represented as an application feature rule 1 here). If the PCRF executes the preprocessing operation, the PCRF may provide the preprocessed application feature field and the corresponding application ID (i.e. the application ID 1) for the TDF as the application feature rule (represented as the application feature rule 1 here). That is, a corresponding relationship between a hash value (or hash group) and an application ID may be sent to the TDF as the application feature rule. The TDF may update the application feature rule 1 into a locally stored application feature base. Thereafter, the TDF may detect the application according to the newly updated application feature rule 1. The application feature rule may be seen as the corresponding relationship between the application ID and the application feature field.

At act 908, the TDF may return an acknowledgment message to the PCRF.

Meanwhile, a BOSS of the operating company may update a subscription and perform policy configuration on the PCRF. For example, the subscription may be updated to add subscription information about whether a subscriber may access the application or not and the like, and a configuration policy of the PCRF may be updated to enable the PCRF to set a corresponding PCC/ADC rule configured to detect and control the application.

Acts 909-913 form a flow that the TDF performs ADC on a user newly attached or newly establishing an IP-CAN section after receiving the application feature rule 1.

At act 909, UE is attached to the network, and requests to establish the IP-CAN session.

At act 910, a PCEF may interact with the PCRF to establish the IP-CAN session, and the PCRF transmits the PCC rule.

At act 911, the PCRF may determine that the user is allowed to access the application provided by the third-party application at act 901 according to subscription information of the user, and thus may contain one or a group of ADC rules in the ADC rule transmitted by the PCRF, the ADC rule containing the application ID 1, the charging policy and the QoS policy. The TDF may install the transmitted ADC rule. If the SCEF indicates the sponsor data connection to be enabled, the PCRF may set a special charging key in the charging policy according to the sponsor ID and the ASP ID, or may further contain the sponsor ID and the ASP ID in the ADC rule. The PCRF may need to interact with an SPR to acquire the subscription of the user.

At act 912, the TDF may return an acknowledgement message.

At act 913, thereafter, when the UE accesses the application, the TDF may perform matching with the application feature base after detecting the IP address, IP triple, IP quintuple and/or URL of the application accessed by the user. For the UE, the TDF may only match application feature rules (including the application feature rule 1) with an application ID the same as that of the ADC rule transmitted by the PCRF. If the PCRF transmits the preprocessed feature rule and the application ID 1, the TDF may adopt the same one or more hash functions configured by the PCRF to perform hashing on the IP address, the IP triple, the IP quintuple or the URL, and match the hashing result with the hash values (or hash groups) provided by the PCRF. In case of successful matching with the hash value (or hash group) in the application feature rule 1, the TDF may judge that the application corresponding to the application feature rule 1 is detected. After the TDF detects the application, the TDF may enforce the ADC rule of the application, namely enforcing the corresponding charging policy, QoS policy and the like.

Acts 914-916 form a flow for a user having been attached or established an IP-CAN session when the TDF receives the application feature rule 1.

At act 914, the PCRF may determine that the user is allowed to access the application provided by the third-party application at act 901 according to subscription information of the user, and thus the PCRF may update the ADC rule to the TDF, wherein one or a group of ADC rules is contained, and the ADC rule may contain the application ID 1, the charging policy and the QoS policy. If the SCEF indicates the sponsor data connection to be enabled, the PCRF may set the special charging key in the charging policy according to the sponsor ID and the ASP ID, or may further contain the sponsor ID and the ASP ID in the ADC rule. The PCRF may need to interact with the SPR to acquire the subscription of the user.

At act 915, the TDF may return an acknowledgement message.

At act 916, thereafter, when the UE accesses the application, the TDF may perform matching with the application feature base after detecting the IP address, IP triple, IP quintuple and/or URL of the application accessed by the user. For the UE, the TDF may only match the application feature rules (including the application feature rule 1) with an application ID the same as that of the ADC rule transmitted by the PCRF. If the PCRF transmits the preprocessed feature rule and the application ID 1, the TDF may adopt the same one or more hash functions configured by the PCRF to perform hashing on the IP address, the IP triple, the IP quintuple or the URL, and match the hashing result with the hash values (or hash groups) provided by the PCRF. In case of successful matching with the hash value (or hash group) in the application feature rule 1, the TDF may judge that the application corresponding to the application feature rule 1 is detected. After the TDF detects the application, the TDF may enforce the ADC rule of the application, namely enforcing the corresponding charging policy, QoS policy and the like.

In the embodiment, after receiving the application feature field provided by the AAC/SCEF and generating the application feature rule, the PCRF may immediately provide the application feature field for the TDF. In another embodiment, the PCRF may judge whether there is attached UE capable of accessing the application or not, and if there is such UE, the PCRF may immediately provide the generated application feature rule for the TDF. If there is no such UE, after the PCRF detects UE capable of accessing the application is attached or establishes an IP-CAN session, the PCRF may provide the application feature rule for the TDF.

In the embodiment, the charging policy and the QoS policy are provided to the PCRF by the AAC/SCEF, while in an alternative embodiment, the charging policy and the QoS policy may also be directly configured on the PCRF by the BOSS.

In the embodiment, the application ID corresponding to the application feature field is determined by the AAC/SCEF, while in an alternative embodiment, the AAC/SCEF may provide information to the PCRF after authorizing the third-party application, and the PCRF may finally determine the application ID corresponding to the third-party application feature field.

In the embodiment, the PCRF actively provides the corresponding relationship between the application ID and the application feature field (and the feature rule) for the TDF. In another embodiment, the TDF may also request to acquire the corresponding relationship from the PCRF. That is, act 907 and act 908 may not be executed at first, when the TDF receives the ADC rule provided by the PCRF at act 911 or act 914, the TDF may judge that there is yet no application feature field corresponding to the application ID 1, the TDF may send a request message for the application feature field to the PCRF, the message may contain the application ID 1. The PCRF may return the application feature field corresponding to the application ID 1 in the acknowledgement message. Thereafter, the TDF may continue executing ADC of act 913 or act 916. Here, a process that the TDF requests to acquire the application feature field may need to be executed only once for an application ID.

In addition, after the embodiment is executed, the third-party application may further update the feature rule (and the corresponding relationship between the application ID and the application feature field). The third-party application may provide a corresponding relationship between the application ID 1 and a new application feature field for the AAC/SCEF. The AAC/SCEF may further provide the corresponding relationship between the application ID 1 and the new application feature field to the PCRF. The PCRF may provide the corresponding relationship between the application ID 1 and the new application feature field for the TDF. The TDF may locally update the application feature RDB.

It may be appreciated that the third-party application may also delete the feature rule, the third-party application may provide the application ID 1 and a deletion indication for the AAC/SCEF. The AAC/SCEF may further provide the application ID 1 and the deletion indication to the PCRF. The PCRF may indicate the TDF to delete the feature rule corresponding to the application ID 1. The TDF may delete the feature rule corresponding to the application ID 1, and may simultaneously delete all ADC rules including the application ID 1.

In the embodiment, the PCRF dynamically provides the ADC rule for the TDF, that is, the application ID 1, the charging policy and the QoS policy are contained in the ADC rule. In another embodiment, the application ID 1, the charging policy and the QoS policy may alternatively be preconfigured on the PCEF as a predefined ADC rule. When the PCRF decides to activate the ADC rule, the PCRF may only need to provide a rule name of the ADC rule for the TDF.

Fourth Embodiment

Figure 16:
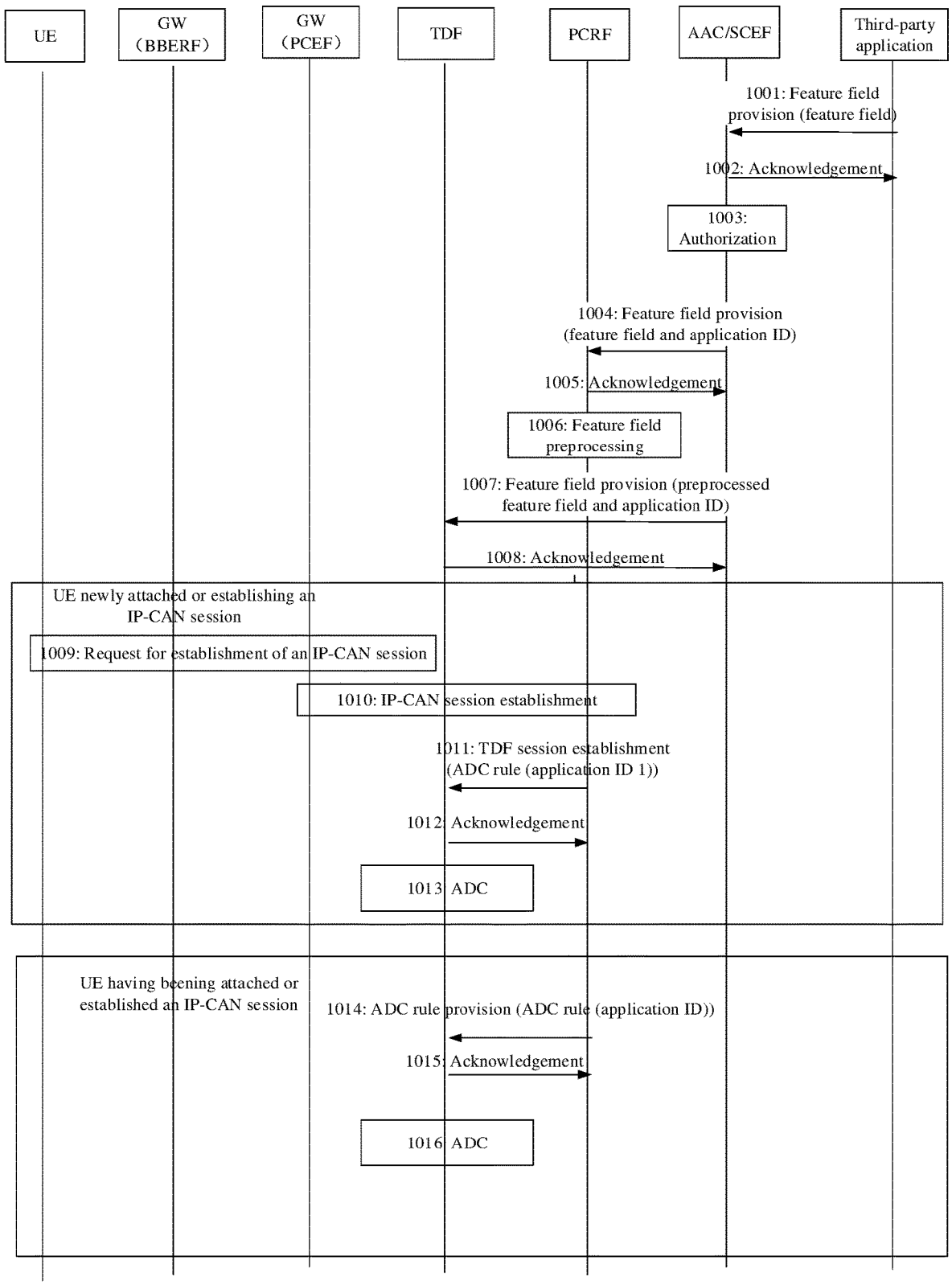
FIG. 16 is a flowchart of a control method for application feature rules according to the fourth embodiment of the present disclosure.

In the exemplary embodiment, an AAC or an SCEF may provide an application feature rule for a TDF, including acts shown in FIG. 16.

At act 1001, a third-party application may decide to deploy a new type of application, and the third-party application may provide an application feature field (also called as packet stream description information) of this type of application for a network to identify the new application for the AAC/SCEF. The application feature field may be an IP quintuple, an IP triple, a URL, an IP address and/or IP address field of a server. The third-party application may further provide service related description information for the AAC/SCEF. The service related description information may be a service type, QoS required by a service, a charging type of the service and the like. The third-party application may further provide a sponsor ID, an ASP ID and indication information about whether to enable a sponsor data connection or not for the AAC/SCEF.

At act 1002, the AAC/SCEF may return an acknowledgement message.

At act 1003, an operating company (AAC/SCEF) may authorize a request of the third-party application, and determine an application ID (represented as application ID 1 here), a charging policy and a QoS policy of the application. The charging policy may include a charging key required to be set for the application, and the QoS policy may include a QCI, ARP and the like required to be set for the application. The application ID may be negotiated by the operating company and the third-party application in advance or dynamically allocated by the SCEF. The AAC/SCEF may determine the application ID according to the sponsor ID and/or the ASP ID.

In an exemplary embodiment, act 1002 may be executed after the AAC/SCEF determines the application ID of the application, and then, the AAC/SCEF may provide the determined application ID for the third-party application.

At act 1004, in an exemplary embodiment, the AAC/SCEF may preprocess the received application feature field. A preprocessing operation is as follows.

For the condition that the application feature field is the URL, the IP triple, the IP quintuple, the IP address and/or the IP address field, the AAC/SCEF may adopt a hash algorithm to process the application feature field.

For a URL with any length, a hash value with a fixed length may be obtained.

In order to reduce a probability of conflict, the PCRF may adopt 2 or 3 hash functions to perform calculation on the same URL, IP triple, IP quintuple, IP address or IP address field to obtain 2 or 3 hash values. In order to ensure no conflict, the PCRF may calculate all effective URLs, and if it is found that any two different URLs, IP triples, IP quintuples, IP addresses or IP address fields have the same hash value, the PCRF may need to add another hash function to ensure that different URLs, IP triples, IP quintuples, IP addresses or IP address fields have different hash values (or hash groups). That is, a hash value (or hash group) is able to uniquely distinguish a URL, an IP quintuple, an IP triple, an IP address or an IP address field.

At act 1005, the AAC/SCEF may provide an application policy for a PCRF, including the application ID 1, the charging key, the QoS policy, the sponsor ID, the ASP ID, the indication information about whether to enable the sponsor data connection or not and the like.

At act 1006, the PCRF may return an acknowledgement message to the AAC/SCEF.

At act 1007, the AAC/SCEF may provide the application feature field and the corresponding application ID (i.e. the application ID 1) for the TDF as an application feature rule (represented as an application feature rule 1 here). If the PCRF executes the preprocessing operation, the AAC/SCEF may provide the one or more preprocessed application feature fields and the corresponding application ID (i.e. the application ID 1) for the TDF as the application feature rule (represented as the application feature rule 1 here). That is, a corresponding relationship between a hash value (or hash group) and an application ID may be sent to the TDF as the application feature rule. The TDF may update the application feature rule 1 into a locally stored application feature base. Thereafter, the TDF may detect the application according to the newly updated application feature rule 1. The application feature rule may be seen as the corresponding relationship between the application ID and the application feature field.

At act 1008, the TDF may return an acknowledgment message to the AAC/SCEF.

Meanwhile, a BOSS of the operating company may update a subscription and perform policy configuration on the PCRF. For example, the subscription may be updated to add subscription information about whether a subscriber may access the application or not and the like, and a configuration policy of the PCRF may be updated to enable the PCRF to set a corresponding PCC rule configured to detect and control the application.

Acts 1009-1013 form a flow that the TDF performs ADC on a user newly attached or newly establishing an IP-CAN section after receiving the application feature rule 1.

At act 1009, UE is attached to the network, and requests to establish the IP-CAN session.

At act 1010, a PCEF may interact with the PCRF to establish an IP-CAN session, and the PCRF may provide the PCC rule to the PCEF.

At act 1011, the PCRF may determine that the user is allowed to access the application provided by the third-party application at act 1001 according to subscription information of the user, and thus may contain one or a group of ADC rules in an ADC rule transmitted by the PCRF, the ADC rule containing the application ID 1, the charging policy and the QoS policy. The TDF may install the transmitted ADC rule. If the SCEF indicates the sponsor data connection to be enabled, the PCRF may set a special charging key in the charging policy according to the sponsor ID and the ASP ID, or may further contain the sponsor ID and the ASP ID in the ADC rule. The PCRF may need to interact with an SPR to acquire the subscription of the user.

At act 1012, the TDF may return an acknowledgement message to the PCRF.

At act 1013, thereafter, when the UE accesses the application, the TDF may perform matching with the application feature base after detecting the IP address, IP triple, IP quintuple and/or URL of the application accessed by the user. For the UE, the TDF may only match application feature rules (including the application feature rule 1) with an application ID the same as that of the ADC rule transmitted by the PCRF. If the PCRF transmits the preprocessed feature rule and the application ID 1, the TDF may adopt the same one or more hash functions configured by the PCRF to perform hashing on the IP address, the IP triple, the IP quintuple or the URL, and match the hashing result with the hash values (or hash groups) provided by the PCRF. In case of successful matching with the hash value (or hash group) in the application feature rule 1, the TDF may judge that the application corresponding to the application feature rule 1 is detected. After the TDF detects the application, the ADC rule of the application is enforced, that is, the corresponding charging policy, QoS policy and the like are enforced.

Acts 1014-1016 form a flow for a user having been attached or established an IP-CAN session when the PCEF receives the application feature rule 1.

At act 1014, the PCRF may determine that the user is allowed to access the application provided by the third-party application at act 1001 according to subscription information of the user, and thus the PCRF may update the ADC rule to the TDF, wherein one ADC rule is contained, and the ADC rule may contain the application ID 1, the charging policy and the QoS policy. If the SCEF indicates the sponsor data connection to be enabled, the PCRF may set the special charging key in the charging policy according to the sponsor ID and the ASP ID, or may further contain the sponsor ID and the ASP ID in the ADC rule. The PCRF may need to interact with the SPR to acquire the subscription of the user.

At act 1015, the TDF may return an acknowledgement message.

At act 1016, thereafter, when the UE accesses the application, the TDF may perform matching with the application feature base after detecting the IP address, IP triple, IP quintuple and/or URL of the application accessed by the user. For the UE, the TDF may only match the application feature rules (including the application feature rule 1) with an application ID the same as that of the ADC rule transmitted by the PCRF. If the PCRF transmits the preprocessed feature rule and the application ID 1, the TDF may adopt the same one or more hash functions configured by the PCRF to perform hashing on the IP address, the IP triple, the IP quintuple or the URL, and match the hashing result with the hash values (or hash groups) provided by the PCRF. In case of successful matching with the hash value (or hash group) in the application feature rule 1, the TDF may judge that the application corresponding to the application feature rule 1 is detected. After the TDF detects the application, the ADC rule of the application is enforced, that is, the corresponding charging policy, QoS policy and the like are enforced.

In the embodiment, the charging policy and the QoS policy are provided to the PCRF by the AAC/SCEF, while in an alternative embodiment, the charging policy and the QoS policy may also be directly configured on the PCRF by the BOSS.

In the embodiment, the AAC/SCEF actively provides the corresponding relationship between the application ID and the application feature field (and the feature rule) for the TDF. In another embodiment, the TDF may also request the AAC/SCEF to acquire the corresponding relationship. That is, act 1007 and act 1008 may not be executed at first, when the TDF receives the ADC rule provided by the PCRF at act 1011 or act 1014, the TDF may judge that there is yet no application feature field corresponding to the application ID 1, the TDF may send a request message for the application feature field to the AAC/SCEF, the message may contain the application ID 1. The AAC/SCEF may return the application feature field corresponding to the application ID 1 in the acknowledgement message. Thereafter, the TDF may continue executing ADC of act 1013 or act 1016. Here, a process that the TDF requests to acquire the application feature field may need to be executed only once for an application ID.

In addition, after the embodiment is executed, the third-party application may further update the feature rule (and the corresponding relationship between the application ID and the application feature field). The third-party application may provide a corresponding relationship between the application ID 1 and a new application feature field for the AAC/SCEF. The AAC/SCEF may provide the corresponding relationship between the application ID 1 and the new application feature field for the TDF. The TDF may locally update the application feature RDB.

It may be appreciated that the third-party application may also delete the feature rule, the third-party application may provide the application ID 1 and a deletion indication for the AAC/SCEF. The AAC/SCEF may indicate the TDF to delete the feature rule corresponding to the application ID 1. The TDF may delete the feature rule corresponding to the application ID 1, and may simultaneously delete all ADC rules including the application ID 1.

In the flows of the first embodiment and the second embodiment, the PCRF or the AAC/SCEF may provide the feature rule to the PCEF. In another embodiment, the PCRF or the AAC/SCEF may store the feature rule in the application feature RDB. The application feature RDB may further provide the feature rule to the PCEF actively or according to the request of the PCEF.

In the flows of the third embodiment and the fourth embodiment, the PCRF or the AAC/SCEF may provide the feature rule for the TDF. In another embodiment, the PCRF or the AAC/SCEF may store the feature rule in the application feature RDB. The application feature RDB may further provide the feature rule for the TDF actively or according to the request of the TDF.

In the embodiment, the PCRF dynamically provides the ADC rule for the TDF, that is, the application ID 1, the charging policy and the QoS policy are contained in the PCC rule. In another embodiment, the application ID 1, the charging policy and the QoS policy may alternatively be preconfigured on the PCEF as a predefined ADC rule. When the PCRF decides to activate the ADC rule, the PCRF may only need to provide a rule name of the ADC rule for the TDF.

Fifth Embodiment

Figure 17:
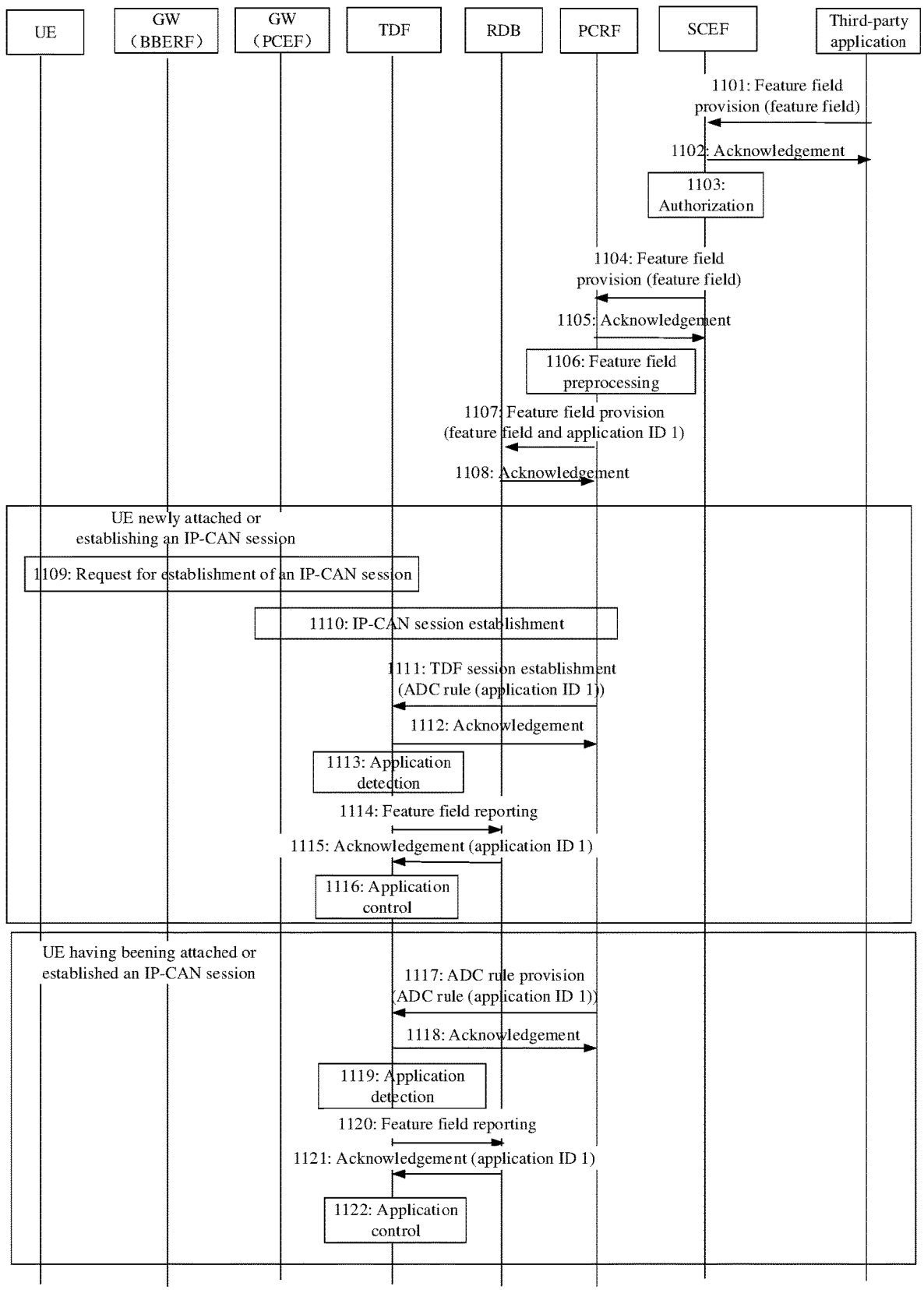
FIG. 17 is a flowchart of a control method for application feature rules according to the fifth embodiment of the present disclosure.

In the exemplary embodiment, a PCRF may provide an application feature rule for an application feature RDB, including acts shown in FIG. 17.

At act 1101, a third-party application may decide to deploy a new type of application, and the third-party application may provide an application feature field (also called as packet stream description information) of this type of application for a network to identify the new application for an SCEF. The application feature field may be an IP quintuple, IP triple and URL of the application, an IP address and/or IP address field of a server. The third-party application may further provide service related description information for the SCEF. The service related description information may be a service type, QoS required by a service and a charging type of the service. The third-party application may further provide a sponsor ID, an ASP ID and indication information about whether to enable a sponsor data connection or not for an AAC/SCEF.

At act 1102, the AAC/SCEF may return an acknowledgement message.

At act 1103, an operating company (AAC/SCEF) may authorize a request of the third-party application, and determine an application ID (represented as application ID 1 here), a charging policy and a QoS policy of the application. The charging policy may include a charging key required to be set for the application, and the QoS policy may include a QCI, ARP and the like required to be set for the application. The application ID may be negotiated by the operating company and the third-party application in advance or dynamically allocated by the SCEF. The AAC/SCEF may determine the application ID according to the sponsor ID and/or the ASP ID.

In an exemplary embodiment, act 1102 may be executed after the AAC/SCEF determines the application ID of the application, and then, the AAC/SCEF may provide the determined application ID for the third-party application.

At act 1104, the AAC/SCEF may provide application feature field to the PCRF. The provided information may include the application feature field, the application ID 1, the charging policy, the QoS policy, the sponsor ID, the ASP ID, the indication information about whether to enable the sponsor data connection or not and the like.

At act 1105, the PCRF may return an acknowledgement message.

At act 1106, optionally, the PCRF may preprocess the received application feature field. A preprocessing operation is as follows.

For the condition that the application feature field is the URL, the IP quintuple, the IP triple, the IP address and/or the IP address field, the PCRF may adopt a hash algorithm to process the application feature field.

For a URL with any length, a hash value with a fixed length may be obtained.

In order to reduce a probability of conflict, the PCRF may adopt 2 or 3 hash functions to perform calculation on the same URL, IP quintuple, IP triple IP address or IP address field to obtain 2 or 3 hash values. In order to ensure no conflict, the PCRF may calculate all effective URLs, and if it is found that any two different URLs, IP triples, IP quintuples, IP addresses or IP address fields have the same hash value, the PCRF may need to add another hash function to ensure that different URLs, IP quintuples, IP triples, IP addresses or IP address fields have different hash values (or hash groups). That is, a hash value (or hash group) is able to uniquely distinguish a URL, an IP triple, an IP quintuple, an IP address or an IP address field.

At act 1107, the PCRF may provide the application feature field and the corresponding application ID (i.e. the application ID 1) for the RDB as an application feature rule (represented as an application feature rule 1 here). If the PCRF executes the preprocessing operation, the PCRF may provide the one or more preprocessed application feature fields and the corresponding application ID (i.e. the application ID 1) for the RDB as the application feature rule (represented as the application feature rule 1 here). That is, a corresponding relationship between a hash value (or hash group) and an application ID may be sent to the RDB as the application feature rule. The RDB may update the application feature rule 1 into a locally stored application feature base. The application feature rule may be seen as the corresponding relationship between the application ID and the application feature field.

At act 1108, the RDB may return an acknowledgment message to the PCRF.

Meanwhile, a BOSS of the operating company may update a subscription and perform policy configuration on the PCRF. For example, the subscription may be updated to add subscription information about whether a subscriber may access the application or not, whether a service function provided by the third-party application may need to be applied or not and the like, and a configuration policy of the PCRF may be updated to enable the PCRF to set a corresponding PCC/ADC rule configured to detect and control the application.

Acts 1109-1116 form a flow that the RDB performs ADC on a user newly attached or newly establishing an IP-CAN section after receiving the application feature rule 1.

At act 1109, UE is attached to the network, and requests to establish the IP-CAN session.

At act 1110, a PCEF may interact with the PCRF to establish an IP-CAN session, and the PCRF transmits the PCC rule to the PCEF.

At act 1111, the PCRF may determine that the user is allowed to access the application provided by the third-party application at act 1101 according to subscription information of the user, and thus may contain one or a group of ADC rules in the ADC rule transmitted by the PCRF, the ADC rule containing the application ID 1, the charging policy and the QoS policy. A TDF may install the transmitted ADC rule. If the SCEF indicates the sponsor data connection to be enabled, the PCRF may set a special charging key in the charging policy according to the sponsor ID and the ASP ID, or may further contain the sponsor ID and the ASP ID in the PCC rule. The PCRF may need to interact with an SPR to acquire the subscription of the user.

At act 1112, the TDF may return an acknowledgement message to the PCRF.

At act 1113, thereafter, when the UE accesses the application, the TDF detects the IP address, IP triple, IP quintuple and/or URL of the application accessed by the user.

At act 1114, the TDF may report the detected IP address, IP triple, IP quintuple and/or URL to the RDB.

At act 1115, the RDB may perform matching according to the application feature base, and may return the matched application ID 1 to the TDF/Trustworthy Service Scheduling Framework (TSSF). If the PCRF transmits the preprocessed feature rule and the application ID 1, the TDF may adopt the same one or more hash functions configured by the PCRF to perform hashing on the IP address, the IP quintuple, the IP triple or the URL, and match the hashing result with the hash values (or hash groups) provided by the PCRF. In case of successful matching with the hash value (or hash group) in the application feature rule 1, the TDF may judge that the application corresponding to the application feature rule 1 is detected.

At act 1116, the TDF may enforce a policy corresponding to the ADC rule 1 according to the application ID 1.

Acts 1117-1122 form a flow for a user having been attached or established an IP-CAN session when the RDB receives the application feature rule 1.

At act 1117, the PCRF may determine that the user is allowed to access the application provided by the third-party application at act 1101 according to subscription information of the user, and thus the PCRF may update the ADC rule to the TDF, wherein one or a group of ADC rules is contained, and the ADC rule may contain the application ID 1, the charging policy and the QoS policy. The TDF may install the transmitted ADC rule. If the SCEF indicates the sponsor data connection to be enabled, the PCRF may set the special charging key in the charging policy according to the sponsor ID and the ASP ID, or may further contain the sponsor ID and the ASP ID in the PCC rule. The PCRF may need to interact with the SPR to acquire the subscription of the user.

At act 1118, the TDF may return an acknowledgement message.

At act 1119, thereafter, when the UE accesses the application, the TDF detects the IP address, IP triple, IP quintuple and/or URL of the application accessed by the user.

At act 1120, the TDF may send the detected IP address, IP triple, IP quintuple and/or URL to the RDB.

At act 1121, the RDB may perform matching according to the application feature base, and may return the corresponding application ID 1 to the TDF. If the PCRF transmits the preprocessed feature rule and the application ID 1, the TDF may adopt the same one or more hash functions configured by the PCRF to perform hashing on the IP address, the IP triple, the IP quintuple or the URL, and match the hashing result with the hash values (or hash groups) provided by the PCRF. In case of successful matching with the hash value (or hash group) in the application feature rule 1, the TDF may judge that the application corresponding to the application feature rule 1 is detected.

At act 1122, the TDF may enforce the policy corresponding to the ADC rule 1 according to the application ID 1.

In the embodiment, after receiving the application feature field provided by the SCEF and generating the application feature rule, the PCRF may immediately provide the application feature field for the RDB. In another embodiment, the PCRF may judge whether there is attached UE capable of accessing the application or not, and if there is such UE, the PCRF may immediately provide the generated application feature rule for the RDB. If there is no such UE, after the PCRF detects UE capable of accessing the application is attached or establishes an IP-CAN session, the PCRF may provide the application feature rule for the RDB.

In the embodiment, the charging policy and the QoS policy are provided to the PCRF by the SCEF, while in an alternative embodiment, the charging policy and the QoS policy may also be directly configured on the PCRF by the BOSS.

In the embodiment, the application ID corresponding to the application feature field is determined by the AAC/SCEF, while in an alternative embodiment, the AAC/SCEF may provide information to the PCRF after authorizing the third-party application, and the PCRF may finally determine the application ID corresponding to the third-party application feature field.

In the embodiment, the PCRF dynamically provides the ADC rule for the TDF, that is, the application ID 1, the charging policy and the QoS policy are contained in the PCC rule. In another embodiment, the application ID 1, the charging policy and the QoS policy may alternatively be preconfigured on the PCEF as a predefined ADC rule. When the PCRF decides to activate the ADC rule, the PCRF may only need to provide a rule name of the ADC rule for the TDF.

Sixth Embodiment

Figure 18:
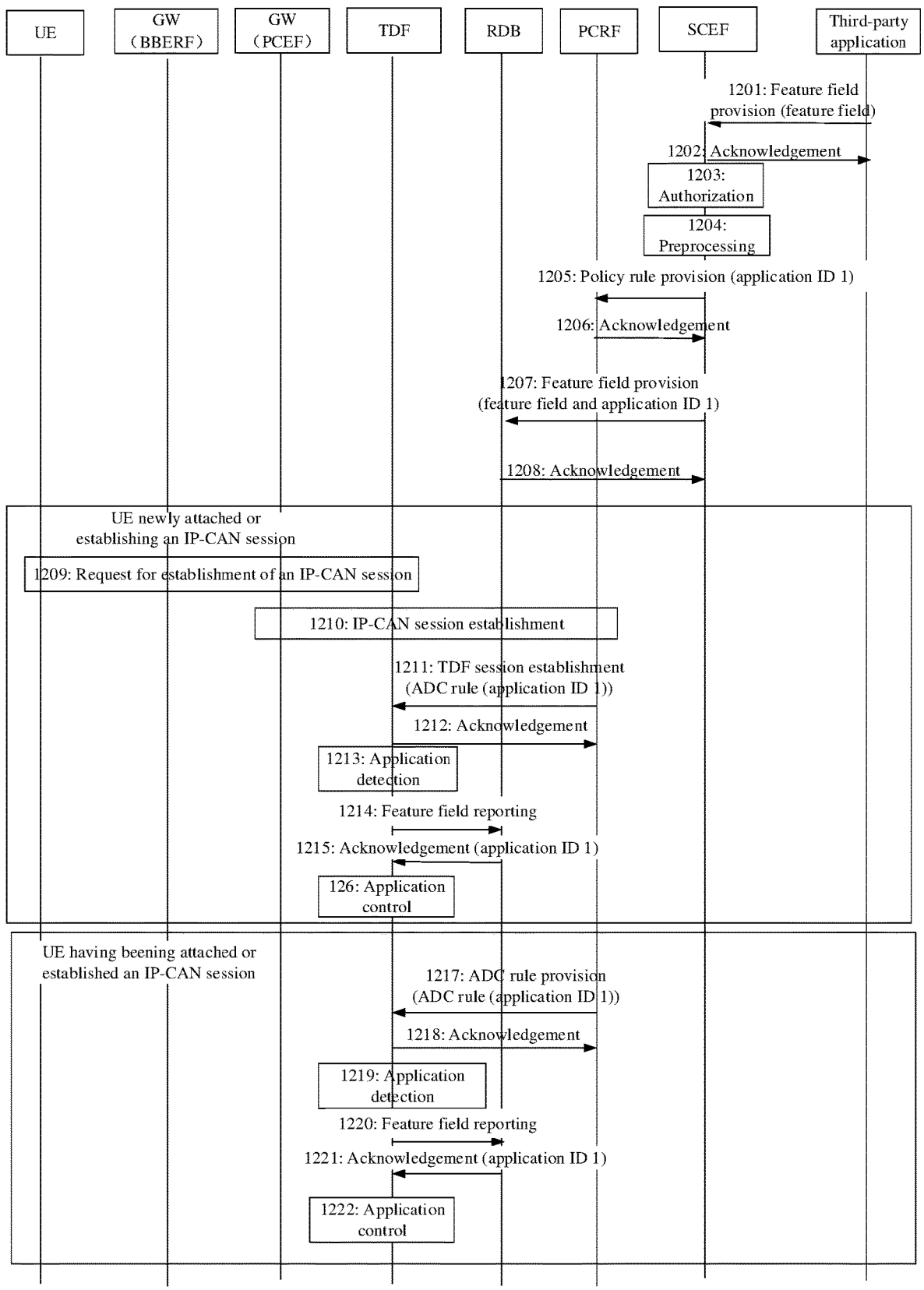
FIG. 18 is a flowchart of a control method for application feature rules according to the sixth embodiment of the present disclosure.

In the exemplary embodiment, an SCEF may provide an application feature rule for an RDB, including acts shown in FIG. 18.

At act 1201, a third-party application may decide to deploy a new type of application, and the third-party application may provide an application feature field (also called as packet stream description information) of this type of application for a network to identify the new application for the SCEF. The application feature field may be an IP triple, IP quintuple and URL of the application, an IP address and/or IP address field of a server. The third-party application may further provide service related description information for the SCEF. The service related description information may be a service type, QoS required by a service, a charging type of the service and the like. The third-party application may further provide a sponsor ID, an ASP ID and indication information about whether to enable a sponsor data connection or not for the AAC/SCEF.

At act 1202, the SCEF may return an acknowledgement message.

At act 1203, an operating company (AAC/SCEF) may authorize a request of the third-party application, and determine an application ID (represented as application ID 1 here), a charging policy and a QoS policy of the application. The charging policy may include a charging key required to be set for the application, and the QoS policy may include a QCI, ARP and the like required to be set for the application. The application ID may be negotiated by the operating company and the third-party application in advance or dynamically allocated by the SCEF. The AAC/SCEF may determine the application ID according to the sponsor ID and/or the ASP ID.

In an exemplary embodiment, act 1202 may be executed after the AAC/SCEF determines the application ID of the application, and then, the AAC/SCEF may provide the determined application ID for the third-party application.

At act 1204, optionally, the AAC/SCEF may preprocess the received application feature field. A preprocessing operation is as follows.

For the condition that the application feature field is the URL, the IP quintuple, the IP triple, the IP address and/or the IP address field, a PCRF may adopt a hash algorithm to process the application feature field.

For a URL with any length, a hash value with a fixed length may be obtained.

In order to reduce a probability of conflict, the PCRF may adopt 2 or 3 hash functions to perform calculation on the same URL, IP quintuple, IP triple, IP address or IP address field to obtain 2 or 3 hash values. In order to ensure no conflict, the PCRF may calculate all effective URLs, and if it is found that any two different URLs, IP quintuples, IP triples, IP addresses or IP address fields have the same hash value, the PCRF may need to add another hash function to ensure that different URLs, IP quintuples, IP triples, IP addresses or IP address fields have different hash values (or hash groups). That is, a hash value (or hash group) is able to uniquely distinguish a URL, an IP quintuple, an IP triple, an IP address or an IP address field.

At act 1205, the AAC/SCEF may provide an application policy to the PCRF, including the application ID 1, the charging key, the QoS policy, the sponsor ID, the ASP ID, the indication information about whether to enable the sponsor data connection or not and the like.

At act 1206, the PCRF may return an acknowledgement message.

At act 1207, the AAC/SCEF may provide the application feature field and the corresponding application ID (i.e. the application ID 1) for an RDB as an application feature rule (represented as an application feature rule 1 here). If the AAC/SCEF executes the preprocessing operation, the PCRF may provide the one or more preprocessed application feature fields and the corresponding application ID (i.e. the application ID 1) for the RDB as the application feature rule (represented as the application feature rule 1 here). That is, a corresponding relationship between a hash value (or hash group) and an application ID may be sent to the RDB as the application feature rule. The RDB updates the application feature rule 1 into a locally stored application feature base. The application feature rule may be seen as the corresponding relationship between the application ID and the application feature field.

At act 1208, the RDB may return an acknowledgment message to the AAC/SCEF.

Meanwhile, a BOSS of the operating company may update a subscription and perform policy configuration on the PCRF. For example, the subscription may be updated to add information about whether a subscriber may access the application or not, and a configuration policy of the PCRF may be updated to enable the PCRF to set a corresponding PCC/ADC rule configured to detect and control the application.

Acts 1209-1216 form a flow that the RDB performs ADC on a user newly attached or newly establishing an IP-CAN section after receiving the application feature rule 1.

At act 1209, UE is attached to the network, and requests to establish the IP-CAN session.

At act 1210, a PCEF may interact with the PCRF to establish an IP-CAN session, and the PCRF transmits the PCC rule to the PCEF.

At act 1211, the PCRF may determine that the user is allowed to access the application provided by the third-party application at act 1201 according to subscription information of the user, and thus may contain one or a group of ADC rules in the ADC rule transmitted by the PCRF, the ADC rule containing the application ID 1, the charging policy and the QoS policy. The TDF may install the transmitted ADC rule. If the SCEF indicates the sponsor data connection to be enabled, the PCRF may set a special charging key in the charging policy according to the sponsor ID and the ASP ID, or may further contain the sponsor ID and the ASP ID in the ADC rule. The PCRF may need to interact with an SPR to acquire the subscription of the user.

At act 1212, the TDF may return an acknowledgement message to the PCRF.

At act 1213, thereafter, when the UE accesses the application, the TDF detects the IP address, IP triple, IP quintuple and/or URL of the application accessed by the user.

At act 1214, the TDF may report the detected IP address, IP triple, IP quintuple and/or URL to the RDB.

At act 1215, the RDB may perform matching according to the application feature base, and may return the matched application ID 1 to the TDF. If the AAC/SCEF transmits the preprocessed feature rule and the application ID 1, the TDF may adopt the same one or more hash functions configured by the PCRF to perform hashing on the IP address, the IP triple, the IP quintuple or the URL, and match the hashing result with the hash values (or hash groups) provided by the PCRF. In case of successful matching with the hash value (or hash group) in the application feature rule 1, the TDF may judge that the application corresponding to the application feature rule 1 is detected.

At act 1216, the TDF may perform application control, and enforce a policy corresponding to the ADC rule 1 according to the application ID 1.

Acts 1217-1222 form a flow for a user having been attached or established an IP-CAN session when the RDB receives the application feature rule 1.

At act 1217, the PCRF may determine that the user is allowed to access the application provided by the third-party application at act 1201 according to subscription information of the user, and thus may contain one or a group of ADC rules in the ADC rule transmitted by the PCRF, the ADC rule containing the application ID 1, the charging policy and the QoS policy. The TDF may install the transmitted ADC rule. If the SCEF indicates the sponsor data connection to be enabled, the PCRF may set the special charging key in the charging policy according to the sponsor ID and the ASP ID, or may further contain the sponsor ID and the ASP ID in the ADC rule. The PCRF may need to interact with the SPR to acquire the subscription of the user.

At act 1218, the TDF may return an acknowledgement message.

At act 1219, thereafter, when the UE accesses the application, the TDF detects the IP address, IP triple, IP quintuple and/or URL of the application accessed by the user.

At act 1220, the TDF may send the detected application feature field, including the IP address, the IP triple, the IP quintuple and/or the URL, to the RDB.

At act 1221, the RDB may perform matching according to the application feature base, and may return the corresponding application ID 1 to the TDF/TSSF. If the AAC/SCEF transmits the preprocessed feature rule and the application ID 1, the TDF may adopt the same one or more hash functions configured by the AAC/SCEF to perform hashing on the IP address, the IP triple, the IP quintuple or the URL, and match the hashing result with the hash values (or hash groups) provided by the PCRF. In case of successful matching with the hash value (or hash group) in the application feature rule 1, the TDF may judge that the application corresponding to the application feature rule 1 is detected.

At act 1222, the TDF may perform application control, and enforce the policy corresponding to the ADC rule 1 according to the application ID 1.

In the embodiment, the charging policy and the QoS policy are provided to the PCRF by the SCEF, while in an alternative embodiment, the charging policy and the QoS policy may also be directly configured on the PCRF by the BOSS.

In the embodiment, the PCRF dynamically provides the ADC rule for the TDF, that is, the application ID 1, the charging policy and the QoS policy are contained in the PCC rule. In another embodiment, the application ID 1, the charging policy and the QoS policy may alternatively be preconfigured on the PCEF as a predefined ADC rule. When the PCRF decides to activate the ADC rule, the PCRF may only need to provide a rule name of the ADC rule for the TDF.

In the fifth embodiment and the sixth embodiment, the PCRF may provide the ADC rule for the TDF, and the TDF may interact with the RDB to obtain the application ID, thereby enforcing the ADC rule according to the application ID. Similarly, the PCRF may provide the PCC rule to the PCEF, and the PCEF may interact with the RDB to obtain the application ID, thereby enforcing the PCC rule according to the application ID.

In the fifth embodiment and the sixth embodiment, the RDB is independently deployed, and may also be integrated with the PCRF or the ACC/SCEF. In such a manner, interaction between the RDB and the PCRF or the ACC/SCEF may be considered as internal interaction.

In the embodiments, a function of determining the application ID and the charging policy and/or the QoS policy for the application feature field may be integrated in the PCRF, the AAC or the SCEF. While in alternative embodiments, the function of determining the application ID and the charging policy and/or the QoS policy for the application feature field may also exist as an independent function entity, which may be called as an application decision-making function entity. That is, the application decision-making function entity may be integrated in the PCRF, the AAC or the SCEF or independently deployed.

An embodiment of the present disclosure also provides a computer-readable storage medium, which may store a computer-executable instruction, the computer-executable instruction being configured to execute the control method for application feature rules.

Those skilled in the art should know that all or part of the acts in the method may be implemented by a flow of a computer program, the computer program may be stored in a computer-readable storage medium, the computer program is executed on a corresponding hardware platform (for example, a system, equipment, a device and an apparatus), and during execution, one or a combination of the acts of the method embodiment is included. In an exemplary embodiment, all or part of the acts of the embodiment may also be implemented by virtue of an integrated circuit, and these acts may form multiple integrated circuit modules respectively, or multiple modules or acts therein may form a single integrated circuit module for implementation. Therefore, the present disclosure is not limited to any specific hardware and software combination. The devices/function modules/function units in the embodiments may be implemented by adopting a universal computing device, and they may be concentrated on a single computing device, and may also be distributed on a network formed by multiple computing devices. When being implemented in form of software function module and sold or used as independent products, the devices/function modules/function units in the embodiments may be stored in a computer-readable storage medium. The abovementioned computer-readable storage medium may be a read-only memory, a magnetic disk, an optical disk or the like.

The above is only the preferred embodiment of the present disclosure and not limit the present disclosure. For those skilled in the art, the present disclosure may have various modifications and variations. Any modifications, equivalent replacements, improvements and the like made within the principle of the present disclosure shall fall within the scope of protection defined by the appended claims of the present disclosure.

INDUSTRIAL APPLICABILITY

By the technical solutions, millions of third-party applications may be rapidly deployed.

What is claimed is:

1. A control method for application feature rules, comprising:
    receiving, by an Application Detection Control (ADC) entity at a network side, an application feature rule provided by an application feature rule function entity or an application feature Rule Database (RDB), wherein the application feature rule comprises one or more application feature fields and a corresponding application Identifier (ID) of a third-party application; and
    performing, by the ADC entity, application detection according to the application feature rule;
    before performing, by the ADC entity, application detection according to the application feature rule, the control method further comprising:
    receiving, by the ADC entity, a policy rule provided by the application feature rule function entity or a policy rule function entity, wherein the policy rule contains an application ID; and
    after receiving, by the ADC entity, the policy rule provided by the application feature rule function entity or the policy rule function entity, the control method further comprising:
    requesting, by the ADC entity, the application feature rule function entity or the application feature RDB for the application feature rule when judging that there is no application feature rule corresponding to the application ID.

2. The method as claimed in claim 1, wherein performing, by the ADC entity, application detection according to the application feature rule comprises:
    matching, by the ADC entity, a detected application feature field of data of the third-party application and the one or more application feature fields in the application feature rule, and in case of successful matching, successfully detecting the third-party application according to the application feature rule.

3. The method as claimed in claim 2, further comprising: after detecting, by the ADC entity, the application feature field of the data of the third-party application,
    adopting, by the ADC entity, one or more hash algorithms to process the detected application feature field of the data of the third-party application and matching the processed application feature field and the one or more application feature fields in the application feature rule.

4. The method as claimed in claim 1, further comprising: after successfully detecting, by the ADC entity, the third-party application according to the application feature rule corresponding to the application ID,
- enforcing, by the ADC entity, a policy in a policy rule on data of the third-party application corresponding to the application ID.

5. The method as claimed in claim 1, wherein
- the policy rule further comprises a sponsor ID and/or Application Service Provider (ASP) ID of the third-party application; or
- the policy rule further comprises setting of a charging key according to the sponsor ID and/or the ASP ID.

6. The method as claimed in claim 1, wherein each application feature field comprises one or more of:
- an Internet Protocol (IP) address, an IP triple, an IP quintuple and a Universal Resource Locator (URL).

7. An Application Detection Control (ADC) entity at a network side, comprising a universal computing device configured to execute the following program modules stored in a computer-readable storage medium:
- a first receiving module, configured to receive an application feature rule provided by an application feature rule function entity or an application feature Rule Database (RDB), wherein the application feature rule comprises one or more application feature fields and a corresponding application Identifier (ID) of a third-party application;
- a detection module, configured to perform application detection according to the application feature rule;
- a second receiving module, configured to, before the detection module performs application detection according to the application feature rule, receive a policy rule provided by the application feature rule function entity or a policy rule function entity, wherein the policy rule contains an application ID; and
- a request module, configured to request, after the second receiving module receives the policy rule provided by the application feature rule function entity or the policy rule function entity, the application feature rule function entity or the application feature RDB for the application feature rule when judging that there is no application feature rule corresponding to the application ID.

8. The ADC entity as claimed in claim 7, wherein
- the detection module is configured to match a detected application feature field of data of the third-party application and the one or more application feature fields in the application feature rule, and in case of successful matching, successfully detect the third-party application according to the application feature rule.

9. The ADC entity as claimed in claim 7, wherein
- the detection module is further configured to, after detecting the application feature field of data of the third-party application, adopt one or more hash algorithms to process the detected application feature field of the data of the third-party application and match the processed application feature field and the one or more application feature fields in the application feature rule.

10. The ADC entity as claimed in claim 7, wherein the universal computing device is further configured to execute the following program module stored in the computer-readable storage medium:
- an enforcement module, configured to, after the detection module successfully detects the third-party application according to the application feature rule corresponding to the application ID, enforce a policy in a policy rule on data of the third-party application corresponding to the application ID.

11. The ADC entity as claimed in claim 7, wherein
- the ADC entity comprises: a Policy and Charging Enforcement Function (PCEF), or a Traffic Detection Function (TDF).

12. A control method for application feature rules, comprising:
- receiving, by an application feature rule function entity, one or more application feature fields provided by a third-party application; and
- providing, by the application feature rule function entity, the one or more application feature fields and a corresponding application Identifier (ID) to an Application Detection Control (ADC) entity at a network side and/or an application feature Rule Database (RDB);
- the control method further comprising:
- providing, by the application feature rule function entity, a policy rule to the ADC entity, wherein the policy rule comprises a corresponding application ID; and
- after providing, by the application feature rule function entity, a policy rule to the ADC entity, the control method further comprising:
- receiving, by the application feature rule function entity, a request for the application feature rule which is sent by the ADC entity when the ADC entity judges that there is no application feature rule corresponding to the application ID.

13. The method as claimed in claim 12, further comprising: after receiving, by the application feature rule function entity, the one or more application feature fields provided by the third-party application,
- adopting, by the application feature rule function entity, one or more hash algorithms to preprocess the one or more application feature fields provided by the third-party application and provide the one or more preprocessed application feature fields and the corresponding application ID to the ADC entity and/or the application feature RDB as an application feature rule.

14. The method as claimed in claim 12, wherein each application feature field comprises one or more of:
- an Internet Protocol (IP) address, an IP triple, an IP quintuple and a Universal Resource Locator (URL).

15. An application feature rule function entity, comprising a universal computing device configured to execute the following program modules stored in a computer-readable storage medium:
- a receiving module, configured to receive one or more application feature fields provided by a third-party application; and
- a sending module, configured to provide the one or more application feature fields and a corresponding application Identifier (ID) to an Application Detection Control (ADC) entity at a network side and/or an application feature Rule Database (RDB);
- wherein the sending module is further configured to provide a policy rule to the ADC, wherein the policy rule comprises a corresponding application ID; and
- the universal computing device is further configured to, after the sending module provides a policy rule to the ADC entity, receive a request for the application feature rule which is sent by the ADC entity when the ADC entity judges that there is no application feature rule corresponding to the application ID.

* * * * *